United States Patent
Murata et al.

(10) Patent No.: US 11,550,177 B2
(45) Date of Patent: Jan. 10, 2023

(54) LIQUID CRYSTAL DISPLAY DEVICE HAVING MULTIPLE DISPLAY MODES

(71) Applicant: Sharp Kabushiki Kaisha, Sakai (JP)

(72) Inventors: Koji Murata, Sakai (JP); Hidefumi Yoshida, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/522,983

(22) Filed: Nov. 10, 2021

(65) Prior Publication Data

US 2022/0155622 A1     May 19, 2022

(30) Foreign Application Priority Data

Nov. 13, 2020 (JP) .............................. JP2020-189277

(51) Int. Cl.
- G02F 1/13 (2006.01)
- G02F 1/133 (2006.01)
- G02F 1/1337 (2006.01)
- G02F 1/1343 (2006.01)

(52) U.S. Cl.
CPC .......... *G02F 1/1323* (2013.01); *G02F 1/1337* (2013.01); *G02F 1/13306* (2013.01); *G02F 1/134345* (2021.01)

(58) Field of Classification Search
CPC combination set(s) only.
See application file for complete search history.

(56) References Cited

U.S. PATENT DOCUMENTS

| | | |
|---|---|---|
| 2007/0040780 A1 | 2/2007 | Gass et al. |
| 2011/0012924 A1 | 1/2011 | Gass et al. |
| 2012/0056914 A1 | 3/2012 | Gass et al. |
| 2012/0147026 A1 | 6/2012 | Gass et al. |
| 2014/0327849 A1* | 11/2014 | Tsai ........................ G02B 30/27 349/15 |
| 2016/0299394 A1* | 10/2016 | Yoshida .............. G02F 1/13306 |

FOREIGN PATENT DOCUMENTS

| | | |
|---|---|---|
| JP | 2011-253206 A | 12/2011 |
| WO | 2015/083401 A1 | 6/2015 |

OTHER PUBLICATIONS

Brott et al., "16.3: Directional Backlight Lightguide Considerations for Full Resolution Autostereoscopic 3D Displays", The Society for Information Display, 2010, pp. 218-221.

* cited by examiner

*Primary Examiner* — Lauren Nguyen
(74) *Attorney, Agent, or Firm* — Keating & Bennett, LLP

(57) ABSTRACT

Provided is a liquid crystal display device including: a liquid crystal panel; and a control circuit. The liquid crystal panel sequentially includes an active matrix substrate, a first alignment film, a liquid crystal layer containing liquid crystal molecules having a negative anisotropy of dielectric constant, a second alignment film aligning the liquid crystal molecules at an angle of 10° or greater and 30° or smaller, and a counter substrate. The active matrix substrate includes a first substrate, and a first electrode and a second electrode that are stacked via a first insulating layer or that face each other on the first substrate. The counter substrate sequentially includes a second substrate, a third electrode, a second insulating layer, and a fourth electrode. The control circuit is configured to switch between application of alternating voltage and application of constant voltage to the third and/or fourth electrode according to a display mode.

7 Claims, 25 Drawing Sheets

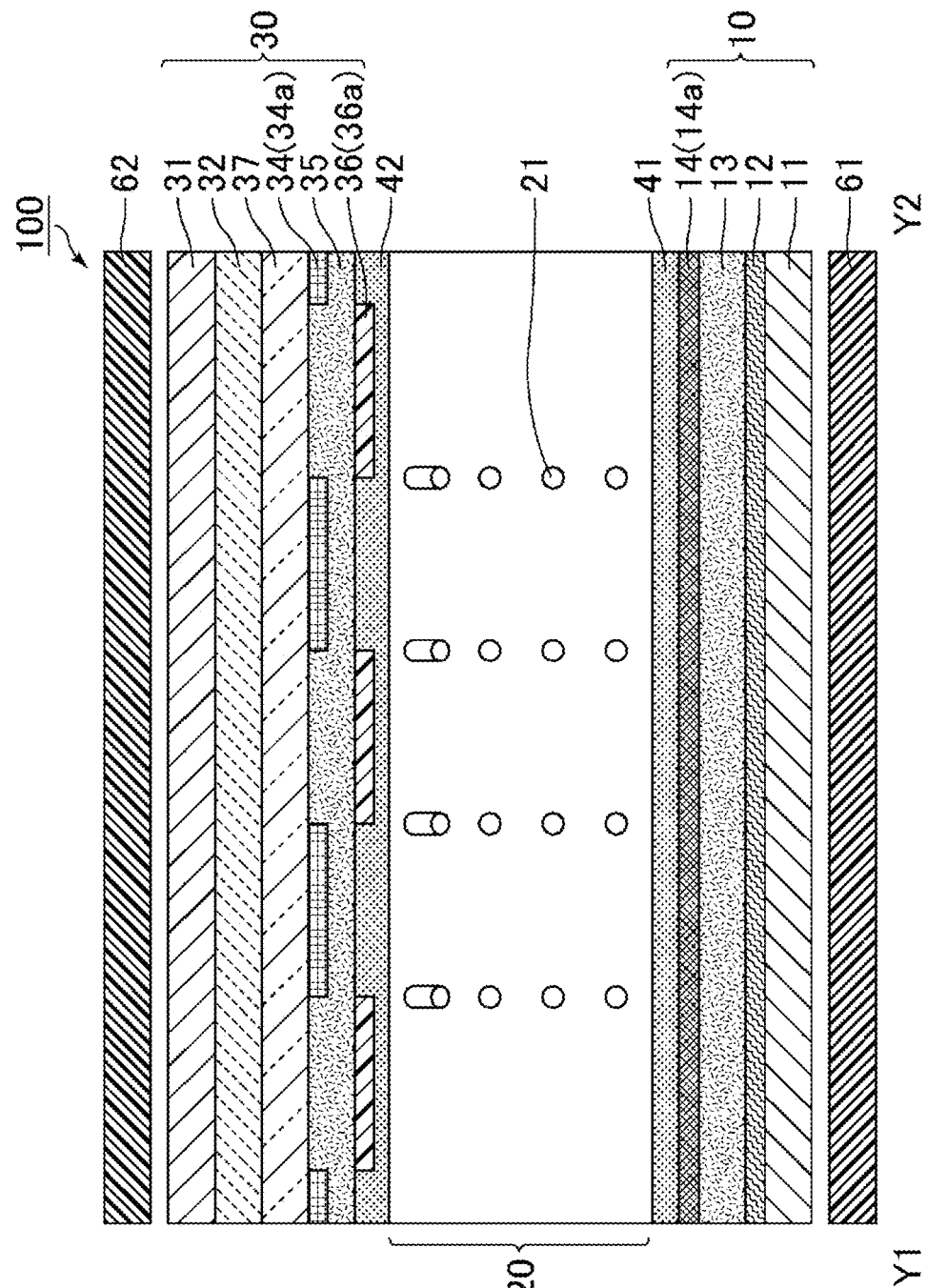

FIG. 26

Example 2

| Display mode | | | First display mode (Narrow viewing angle mode) | Second display mode (Wide viewing angle mode) | Third display mode (High speed response mode) |
|---|---|---|---|---|---|
| Pre-tilt angle on active matrix substrate side | | | 0° | 0° | 0° |
| Pre-tilt angle on counter substrate side | | | 20° | 20° | 20° |
| Applied voltage | Active matrix substrate side | First electrode | 0~6V | 0~6V | 0~6V |
| | | Second electrode | 0V (Grounded) | 0V (Grounded) | 0V (Grounded) |
| | Counter substrate side | Third electrode | 0V* (Grounded) | 10V | 0V (Grounded) |
| | | Fourth electrode | 0V | 10V | 10V |
| Evaluation results | Maximum mode efficiency | | 82% | 57% | 50% |
| | Maximum contrast ratio | | 1049 | 77 | 199 |
| | Response sum (tr+tf) | | 22ms | 15ms | 12ms |
| Simulation results of contrast ratio | | | | | |

FIG.27

Example 3

| Display mode | | First display mode (Narrow viewing angle mode) | Second display mode (Wide viewing angle mode) | Third display mode (High speed response mode) |
|---|---|---|---|---|
| Pre-tilt angle on active matrix substrate side | | 0° | 0° | 0° |
| Pre-tilt angle on counter substrate side | | 10° | 10° | 10° |
| Applied voltage | Active matrix substrate side | First electrode | 0~6V | 0~6V | 0~6V |
| | | Second electrode | 0V (Grounded) | 0V (Grounded) | 0V (Grounded) |
| | Counter substrate side | Third electrode | 0V (Grounded) | 10V | 0V (Grounded) |
| | | Fourth electrode | 0V | 10V | 10V |
| Evaluation results | Maximum mode efficiency | | 82% | 57% | 50% |
| | Maximum contrast ratio | | 1053 | 178 | 270 |
| | Response sum (tr+tf) | | 22ms | 15ms | 12ms |
| Simulation results of contrast ratio | | | | |

FIG.28

LIQUID CRYSTAL DISPLAY DEVICE HAVING MULTIPLE DISPLAY MODES

CROSS-REFERENCE TO RELATED APPLICATIONS

The present application claims priority under 35 U.S.C. § 119 to Japanese Patent Application No. 2020-189277 filed on Nov. 13, 2020, the contents of which are incorporated herein by reference in their entirety.

BACKGROUND OF THE INVENTION

Field of the Invention

The present invention relates to a liquid crystal display device.

Description of Related Art

Liquid crystal display devices are display devices utilizing a liquid crystal composition to display images. In a typical display mode thereof, voltage is applied to a liquid crystal composition sealed between paired substrates such that the alignment of liquid crystal molecules in the liquid crystal composition is changed according to the applied voltage, whereby the amount of light passing through the paired substrates is controlled. Such liquid crystal display devices have advantageous features such as thin profile, light weight, and low power consumption, and are therefore used in a variety of fields.

Studies to enhance the viewing angle characteristics of liquid crystal display devices have been made such that the same image can be observed regardless of whether the viewing angle range is narrow or wide. For example, WO 2015/083401 discloses a liquid crystal display device including: a first substrate that includes paired electrodes; a second substrate that includes a switching element, a pixel electrode electrically connected to the switching element, and a common electrode; and a liquid crystal layer disposed between the first substrate and the second substrate and containing liquid crystal molecules aligned parallel to the first substrate and the second substrate. At least one of the paired electrodes includes a first linear portion extending in a first direction. At least one of the pixel electrode or the common electrode includes a second linear portion extending in a second direction intersecting the first direction. In a first display state in which voltage is applied between the paired electrodes and no voltage is applied between the pixel electrode and the common electrode, the liquid crystal molecules are aligned vertical or parallel to the first direction. In a second display state in which voltage is applied between the paired electrodes and between the pixel electrode and the common electrode, the liquid crystal molecules are aligned in a different direction from the alignment direction in the first display state. Simultaneously achieving high speed response and wide viewing angle is studied in the document.

Meanwhile, a display method considered in terms of privacy protection is one that allows observation of an image in a narrow viewing angle range but makes the image difficult to observe in a wide viewing angle range. For example, JP 2011-253206 A discloses a liquid crystal display device including a liquid crystal display panel, first and second sets of regions in the liquid crystal display panel, and circuitry being adapted to apply an electric field in first and second different ways in the first and second sets of regions respectively, wherein a display can be switched between a public mode and a private mode, and a masking image is displayed in the private mode. Herein, this technique is referred to as a veil-view technique (function).

BRIEF SUMMARY OF THE INVENTION

In terms of ensuring privacy, a display method has been studied which can switch between a narrow viewing angle mode that allows an image to be observable in a narrow viewing angle range but makes the image less observable in a wide viewing angle range and a wide viewing angle mode that allows the image to be observable also in the wide viewing angle range. The response speed of liquid crystal molecules is reduced in a low temperature environment. Thus, vehicle-mounted displays, for example, are further desired to be switchable to a high speed response mode which can increase the response speed of liquid crystal molecules according to need. Liquid crystal display devices for video games are also desired to have a high response speed. WO 2015/083401 studies simultaneous achievement of high speed response and a wide viewing angle but unfortunately fails to study switching display modes. JP 2011-253206 A fails to study switching to a high speed response mode. Furthermore, the liquid crystal display device disclosed in JP 2011-253206 A cannot ensure sufficient privacy in terms of observation from the left-right directions of its display screen, although making an image difficult to observe from a direction oblique to its display screen.

In response to the above issues, an object of the present invention is to provide a liquid crystal display device that can switch between three different display modes and incorporate the veil-view function.

(1) One embodiment of the present invention is directed to a liquid crystal display device including: a liquid crystal panel; and a control circuit, the liquid crystal panel including sub-pixels arranged in a matrix pattern in an in-plane direction and sequentially including an active matrix substrate, a first alignment film, a liquid crystal layer containing liquid crystal molecules having a negative anisotropy of dielectric constant, a second alignment film, and a counter substrate, the second alignment film aligning the liquid crystal molecules with no voltage applied at an angle of 10° or greater and 30° or smaller with respect to the counter substrate, the active matrix substrate including a first substrate, and a first electrode and a second electrode that are stacked via a first insulating layer or that face each other on the first substrate, at least one of the first electrode or the second electrode being disposed for each sub-pixel and including linear electrode portions extending in a first direction, the counter substrate sequentially including a second substrate, a third electrode, a second insulating layer, and a fourth electrode, at least one of the third electrode or the fourth electrode including linear electrode portions extending in a second direction intersecting the first direction in a plan view, the control circuit being configured to switch between application of an alternating voltage and application of a constant voltage to the third electrode and/or the fourth electrode according to a certain display mode selected from a first display mode that allows a first image to be observable in a narrow viewing angle range including a normal direction of the liquid crystal panel, a second display mode that allows the first image to be observable in a wide viewing angle range including the narrow viewing angle range, and a third display mode that provides a higher response speed of the liquid crystal molecules than the first display mode and the second display mode.

(2) In an embodiment of the present invention, the liquid crystal display device includes the structure (1), in the first display mode, the control circuit applies to the third electrode and the fourth electrode a constant voltage common to the first electrode or the second electrode, in the second display mode, the control circuit executes operation (a) of applying an alternating voltage to the third electrode and the fourth electrode or operation (b) of applying to one of the third electrode and the fourth electrode a constant voltage common to the first electrode or the second electrode and applying an alternating voltage to the other of the third electrode and the fourth electrode, and in the third display mode, the control circuit applies to one of the third electrode and the fourth electrode a constant voltage common to the first electrode or the second electrode and applies to the other of the third electrode and the fourth electrode an alternating voltage higher than the alternating voltage applied to the third electrode or the fourth electrode in the second display mode.

(3) In an embodiment of the present invention, the liquid crystal display device includes the structure (2), and in the third display mode, the control circuit applies to the third electrode a constant voltage common to the first electrode or the second electrode and applies to the fourth electrode an alternating voltage higher than the alternating voltage applied to the third electrode or the fourth electrode in the second display mode.

(4) In an embodiment of the present invention, the liquid crystal display device includes the structure (2), and in the third display mode, the control circuit applies to the fourth electrode a constant voltage common to the first electrode or the second electrode and applies to the third electrode an alternating voltage higher than the alternating voltage applied to the third electrode or the fourth electrode in the second display mode.

(5) In an embodiment of the present invention, the liquid crystal display device includes any one of the structures (1) to (4), and the first direction and the second direction form an angle of 60° or greater and 90° or smaller.

(6) In an embodiment of the present invention, the liquid crystal display device includes any one of the structures (1) to (5), and the third electrode and the fourth electrode each include linear electrode portions extending in the second direction intersecting the first direction in a plan view.

(7) In an embodiment of the present invention, the liquid crystal display device includes any one of the structures (1) to (6), the liquid crystal panel includes display units that utilize a veil-view function to display an image, the display units each include a pair of sub-pixels arranged adjacent to each other, one of the sub-pixels being a first sub-pixel selected from odd-number rows and the other being a second sub-pixel selected from even-number rows, and the control circuit in the first display mode inputs different image signals to the respective sub-pixels so as to allow a second image, different from the first image, to be observed in the wide viewing angle range.

The present invention can provide a liquid crystal display device that can switch between three different display modes and incorporate the veil-view function.

BRIEF DESCRIPTION OF THE DRAWINGS

FIG. 3 is a schematic cross-sectional view taken along the line Y1-Y2 in FIG. 1.

FIG. 26 shows a table summarizing evaluation results of a liquid crystal display device according to Example 2.

FIG. 27 shows a table summarizing evaluation results of the liquid crystal display device according to Example 3.

FIG. 28 shows a table summarizing evaluation results of a liquid crystal display device according to Comparative Example 1.

DETAILED DESCRIPTION OF THE INVENTION

Hereinafter, an embodiment of the present invention is described. The present invention is not limited to the following embodiment, and the design of the present invention can be modified as appropriate within the range satisfying the configuration of the present invention. Hereinafter, like reference signs refer to the same portions or the portions having the same function throughout the drawings, and redundant description of already described portions is omitted as appropriate. The modes in the present invention may appropriately be combined within the gist of the present invention.

The liquid crystal display device according to the embodiment of the present invention includes a liquid crystal panel; and a control circuit, the liquid crystal panel including sub-pixels arranged in a matrix pattern in an in-plane direction and sequentially including an active matrix substrate, a first alignment film, a liquid crystal layer containing liquid crystal molecules having a negative anisotropy of dielectric constant, a second alignment film, and a counter substrate, the second alignment film aligning the liquid crystal molecules with no voltage applied at an angle of 10° or greater and 30° or smaller with respect to the counter substrate, the active matrix substrate including a first substrate, and a first electrode and a second electrode that are stacked via a first insulating layer or that face each other on the first substrate, at least one of the first electrode or the second electrode being disposed for each sub-pixel and including linear electrode portions extending in a first direction, the counter substrate sequentially including a second substrate, a third electrode, a second insulating layer, and a fourth electrode, at least one of the third electrode or the fourth electrode including linear electrode portions extending in a second direction intersecting the first direction in a plan view, the control circuit being configured to switch between application of an alternating voltage and application of a constant voltage to the third electrode and/or the fourth electrode according to a certain display mode selected from a first display mode that allows a first image to be observable in a narrow viewing angle range including a normal direction of the liquid crystal panel, a second display mode that allows the first image to be observable in a wide viewing angle range including the narrow viewing angle range, and a third display mode that provides a higher response speed of the liquid crystal molecules than the first display mode and the second display mode.

Figure 1:
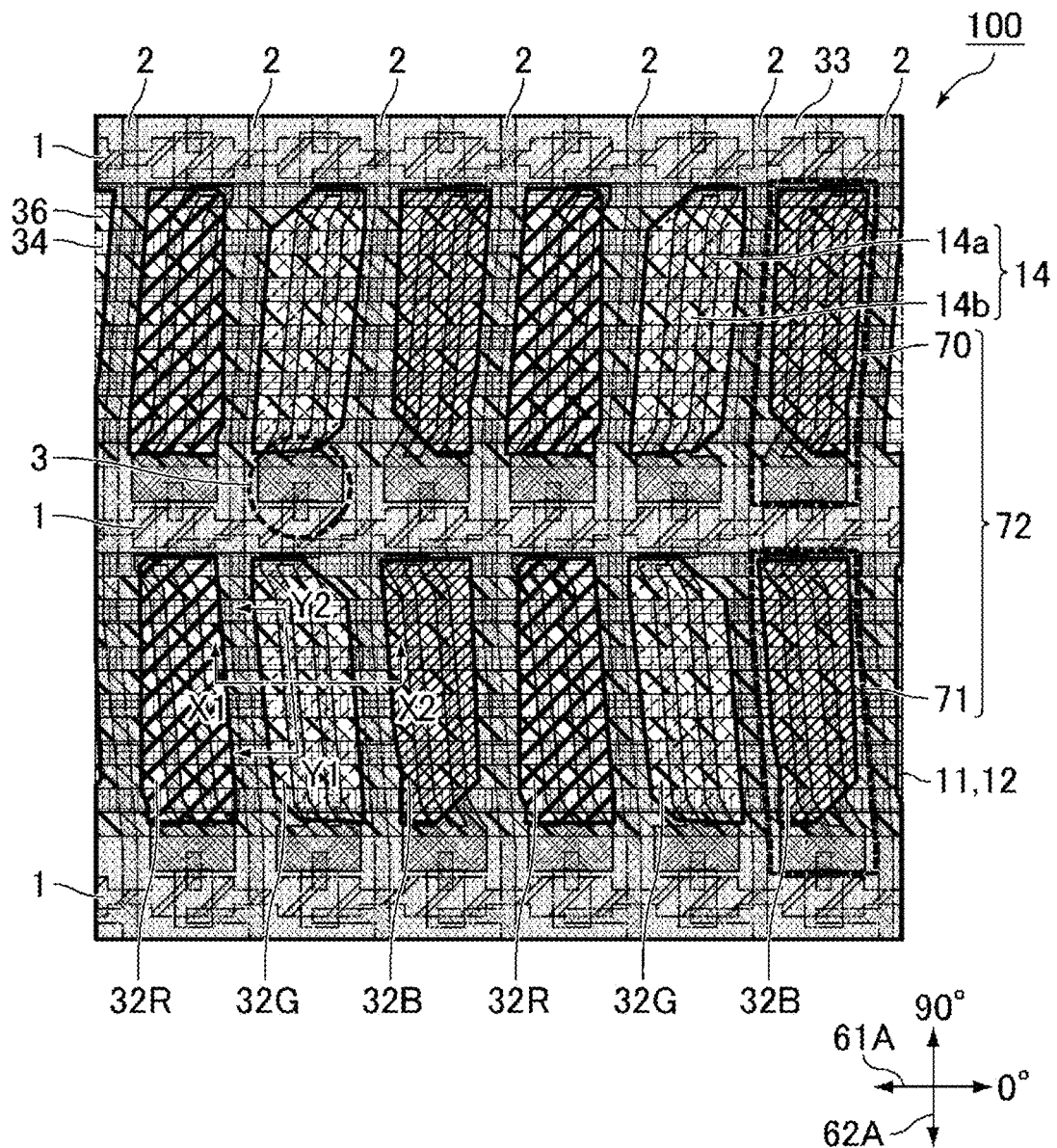
FIG. 1 is a schematic plan view of an exemplary liquid crystal display device according to an embodiment.
Figure 2:
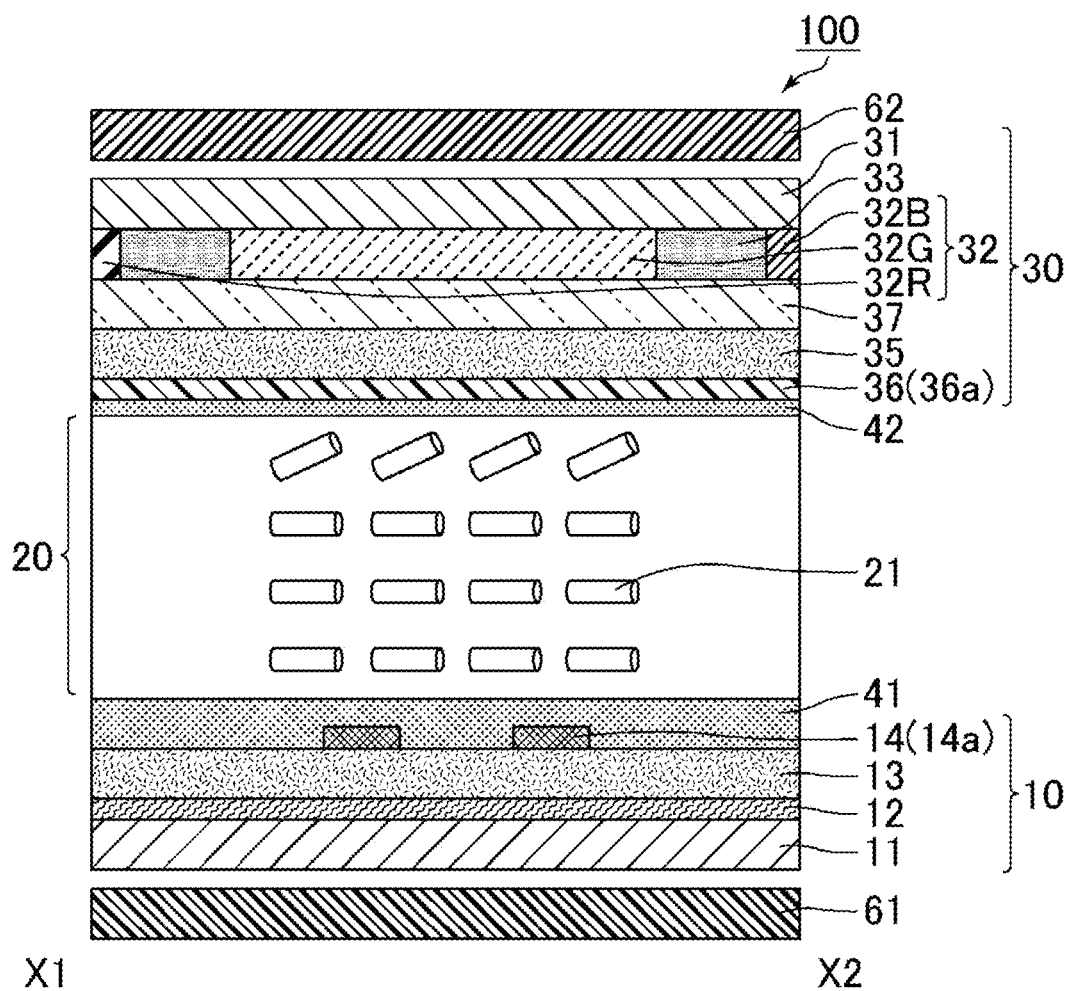
FIG. 2 is a schematic cross-sectional view taken along the line X1-X2 in FIG. 1.
Figure 4A:
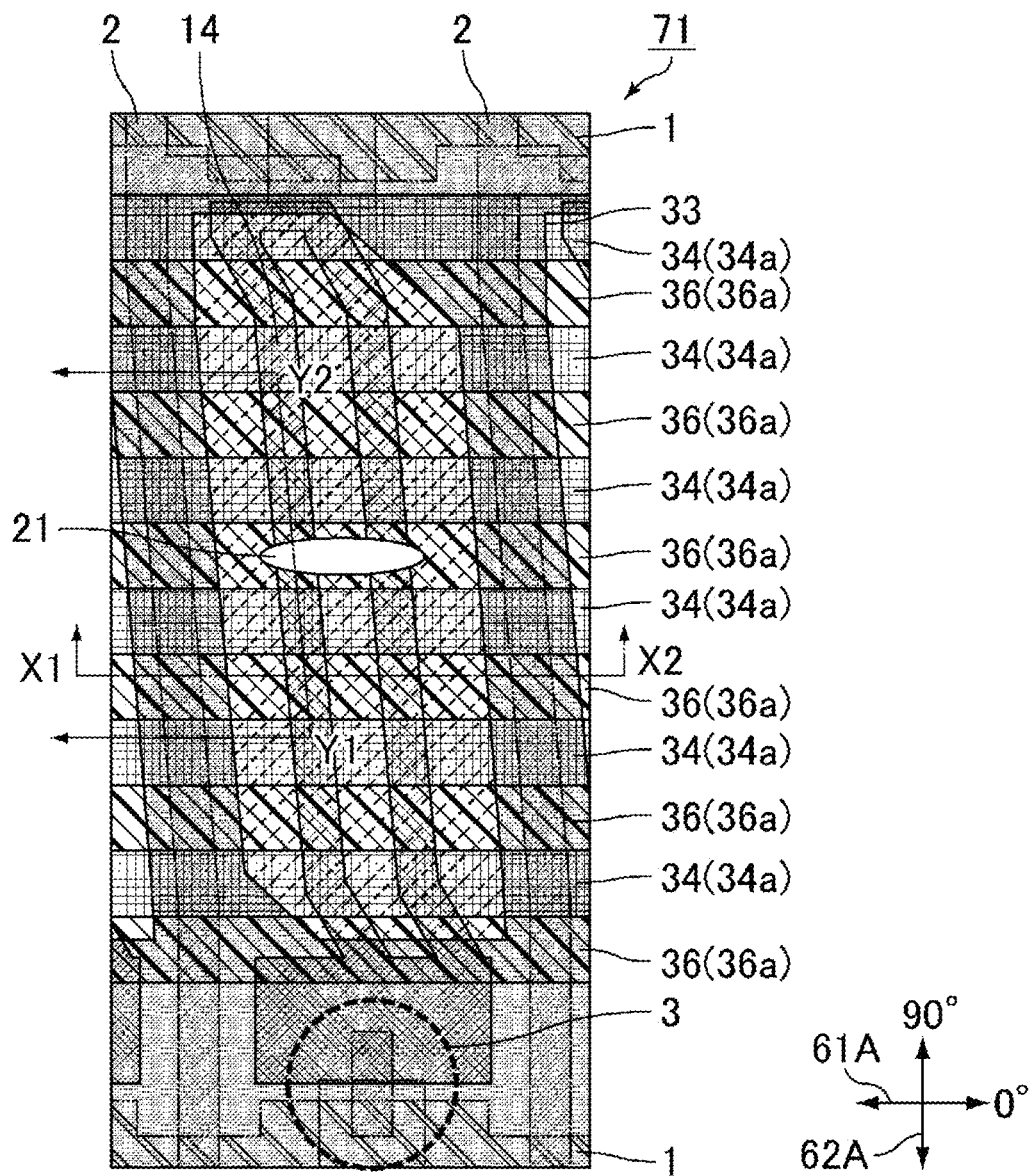
FIG. 4A is a schematic plan view of one sub-pixel of the liquid crystal display device shown in FIG. 1.
Figure 4B:
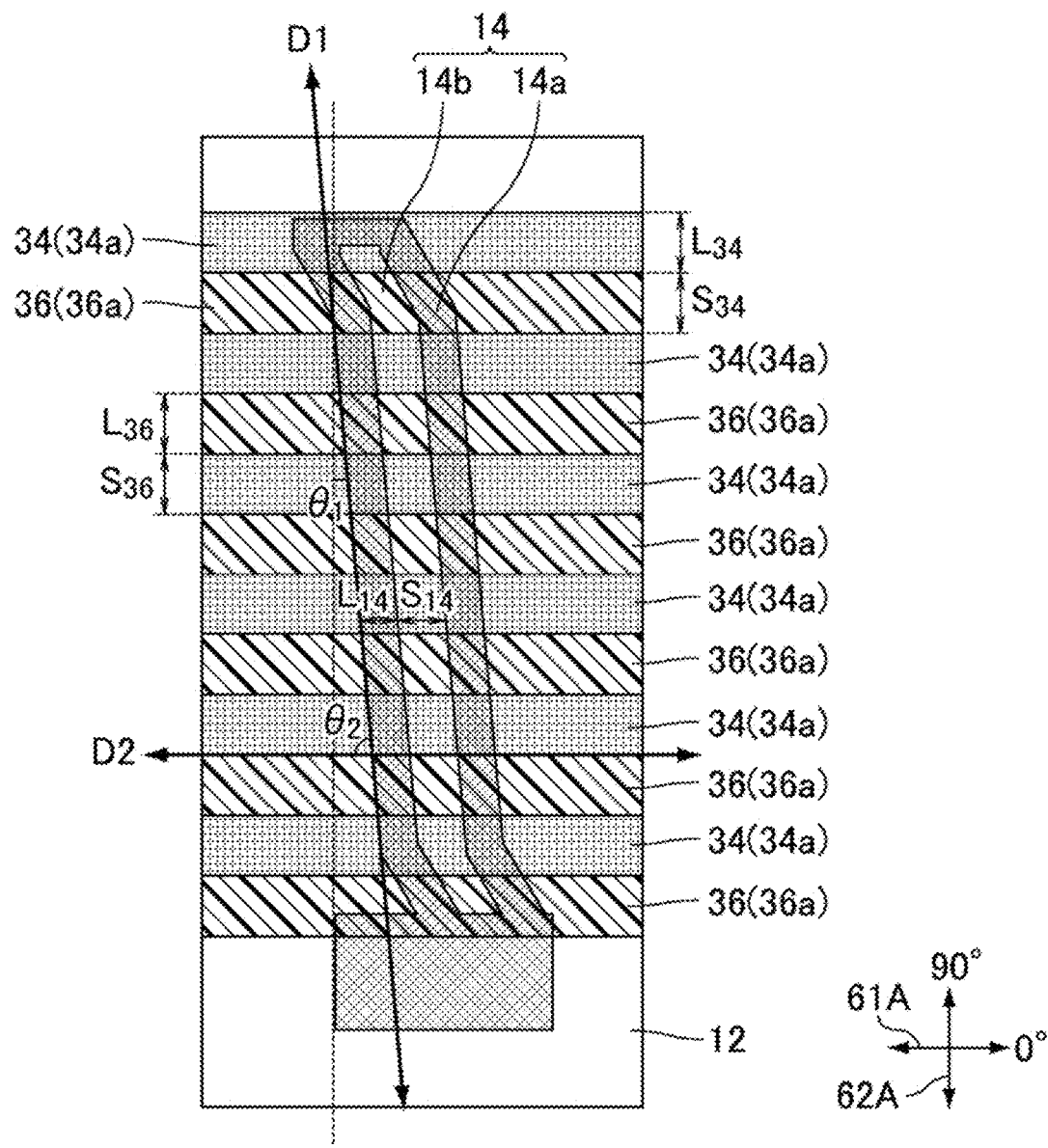
FIG. 4B is a schematic plan view illustrating arrangement of a first electrode, a second electrode, a third electrode, and a fourth electrode in FIG. 4A.

The liquid crystal display device according to the embodiment is described below with reference to the drawings. FIG. 1 is a schematic plan view of an exemplary liquid crystal display device according to the embodiment. FIG. 2 is a schematic cross-sectional view taken along the line X1-X2 in FIG. 1. FIG. 3 is a schematic cross-sectional view taken along the line Y1-Y2 in FIG. 1. FIG. 4A is a schematic plan view of one sub-pixel of the liquid crystal display device shown in FIG. 1. FIG. 4B is a schematic plan view illustrating arrangement of a first electrode, a second electrode, a third electrode, and a fourth electrode in FIG. 4A. The "sub-pixel" as used herein refers to a region surrounded by two adjacent gate lines 1 and two adjacent source lines 2 on an active matrix substrate 10 as shown in FIG. 1 described later.

As shown in FIG. 1, a liquid crystal panel 100 includes sub-pixels arranged in a matrix pattern in the in-plane direction. The sub-pixels include the later-described first sub-pixel 70 and second sub-pixel 71 and are simply referred to as "sub-pixels" when no particular distinguishment is needed between the first sub-pixel 70 and the second sub-pixel 71. Each sub-pixel is provided with an optical opening that allows light to pass through the liquid crystal panel 100. In the case where the liquid crystal panel 100 is a transmissive one, the optical opening is a region that allows light emitted from the back surface of the liquid crystal panel 100 to travel toward the front surface of the liquid crystal panel 100. In the case where the liquid crystal panel 100 is a reflective one, the optical opening is a region that allows incident light, which enters from the outside of the liquid crystal panel 100, and reflected light, which is the incident light emitted toward the outside of the liquid crystal panel 100 after being reflected inside the liquid crystal panel 100, to pass through the liquid crystal panel 100. The optical opening may be superimposed with, for example, a transparent component such as a polarizer or a color filter in a plan view.

As shown in FIG. 2, the liquid crystal panel 100 sequentially includes the active matrix substrate 10, a first alignment film 41, a liquid crystal layer 20, a second alignment film 42, and a counter substrate 30. Herein, the side closer to the screen (display screen) of the liquid crystal display device is also referred to as the "viewer side (front surface side)", and the side farther from the screen (display screen) of the liquid crystal display device is also referred to as the "back surface side". The liquid crystal panel 100 may include on the back surface side (on the side remote from the liquid crystal layer 20 of the active matrix substrate 10) a first polarizer 61 and on the front surface side (on the side remote from the liquid crystal layer 20 of the counter substrate 30) a second polarizer 62. The first polarizer 61 and the second polarizer 62 are preferably linearly polarizers. An absorption axis 61A of the first polarizer 61 and an absorption axis 62A of the second polarizer 62 are preferably arranged in the crossed Nicols such that they are perpendicular to each other. At least one of the absorption axis 61A or the absorption axis 62A may be parallel to the longitudinal direction of the sub-pixels.

As shown in FIG. 1, the active matrix substrate 10 includes on the first substrate 11 parallel gate lines 1 and parallel source lines 2 intersecting the gate lines 1 via an insulating film. The gate lines 1 and the source lines 2 are arranged in a grid pattern as a whole. At each intersection of the gate lines 1 and the source lines 2 is disposed a thin film transistor (TFT) 3 as a switching element. Examples of the material for the gate lines 1 and the source lines 2 include metal materials such as aluminum, copper, titanium, molybdenum, chromium, and an alloy of any of these. Examples of the first substrate 11 and the later-described second substrate 31 include, but are not limited to, substrates made of a resin such as polycarbonate and glass substrates.

The active matrix substrate includes a first substrate, and a first electrode and a second electrode that are stacked via a first insulating layer or that face each other on the first substrate. Hereinafter, the embodiment describes the case of employing a fringe field switching (FFS) electrode structure in which the active matrix substrate 10 includes the first substrate 11, and a first electrode 12 and a second electrode 14 stacked via a first insulating layer 13 as shown in FIG. 2.

Alternatively, an in-plane switching (IPS) electrode structure may be employed in which the active matrix substrate includes a first substrate, and a first electrode and a second electrode that face each other on the first substrate. Examples of the material for the first insulating layer 13 and the later-described second insulating layer 35 include inorganic materials such as silicon oxide and silicon nitride.

At least one of the first electrode 12 or the second electrode 14 is disposed for each sub-pixel and includes linear electrode portions extending in a first direction. The embodiment describes the case in which the second electrode 14 is disposed for each pixel and includes linear electrode portions extending in the first direction.

The first electrode 12 is preferably a solid electrode. The first electrode 12 may be disposed for each sub-pixel, may be disposed for each group of multiple sub-pixels, or may be disposed in the entire display region regardless of the boundaries of sub-pixels. The solid electrode means an electrode without slits or openings at least in a region superimposed with the optical openings of the sub-pixels in a plan view. Examples of the material for the first electrode 12 include transparent conductive materials such as indium tin oxide (ITO) and indium zinc oxide (IZO).

The second electrode 14 is disposed for each sub-pixel and includes linear electrode portions 14a extending in the first direction. Each second electrode 14 has a planar shape in which the linear electrode portions 14a are closed at both ends as shown in FIG. 4A and FIG. 4B, for example. Each second electrode 14 may be provided with an opening 14b surrounded by electrode portions. The first direction may form an angle θ1 of 0° to 15°, more preferably 0° to 5°, with the absorption axis 61A of the first polarizer 61 or the absorption axis 62A of the second polarizer 62. FIG. 4B shows an example of the case in which the absorption axis 62A is parallel to the first direction D1 and the longitudinal direction of the sub-pixel 71. As shown in FIG. 4B, each linear electrode portion 14a may include at least a portion extending in the first direction D1 and may include a portion extending in a different direction from the first direction D1. Examples of the material for the second electrodes 14 include transparent conductive materials such as ITO and IZO. The electrode width $L_{14}$ of one linear electrode portion 14a may be 2 µm or greater and 5 µm or smaller, and the distance (width of the opening) $S_{14}$ between two adjacent linear electrode portions 14a may be 2 µm or greater and 5 µm or smaller.

For example, the second electrodes 14 disposed for the respective sub-pixels may be electrically connected to each other and may apply a common constant voltage to the sub-pixels, and the first electrodes 12 disposed for the respective sub-pixels may each be electrically connected to the corresponding source line 2 via the semiconductor layer of the corresponding TFT 3 and may apply different magnitudes of voltage to the sub-pixels in response to image signals. Alternatively, the second electrodes 14 disposed for the respective sub-pixels may each be electrically connected to the corresponding source line 2 via the semiconductor layer of the corresponding TFT 3 and may apply magnitudes of voltage to the sub-pixels in response to image signals, and the first electrode 12 may be formed on the entire display region regardless of the boundaries of the sub-pixels, or multiple first electrodes 12 electrically connected to each other may be disposed for the respective sub-pixels and may apply a common constant voltage to the sub-pixels.

The liquid crystal layer 20 contains liquid crystal molecules 21 having a negative anisotropy of dielectric constant. In other words, the liquid crystal molecules 21 have a negative value for the anisotropy of dielectric constant (Δε) defined by the following formula. The anisotropy of dielectric constant of the liquid crystal molecules 21 may be −2.0 to −5.0. The liquid crystal molecules 21 are preferably homogeneously aligned in a no-voltage-applied state (with no voltage applied). The direction of the major axes of the liquid crystal molecules 21 with no voltage applied is also referred to as the initial alignment of the liquid crystal molecules. The term "with no voltage applied" includes a state with a voltage lower than the threshold value of the liquid crystal molecules applied.

Δε=(dielectric constant of liquid crystal molecules in major axis direction)−(dielectric constant of liquid crystal molecules in minor axis direction)

The expression "with no voltage applied" means the state in which a voltage equal to or higher than the threshold value of the liquid crystal molecules is not applied to the liquid crystal layer 20. Examples thereof include the state in which the same constant voltage is applied to all of the first electrode, the second electrodes, the third electrode, and the fourth electrode; the state in which a constant voltage is applied to at least one of the first electrode, the second electrodes, the third electrode, or the fourth electrode and a voltage lower than the threshold value of the liquid crystal molecules is applied to the other electrode(s), relative to the constant voltage.

As shown in FIG. 3, the counter substrate 30 sequentially includes the second substrate 31, color filters 32, a third electrode 34, the second insulating layer 35, and a fourth electrode 36. The third electrode 34 and the fourth electrode 36 may each be a transparent electrode. Examples of the material for the transparent electrode include transparent conductive materials such as ITO and IZO. The third electrode 34 and the fourth electrode 36 are disposed at least in a region superimposed with the optical opening of each sub-pixel. Each of the third electrode 34 and the fourth electrode 36 may be disposed for each sub-pixel, may be disposed for each group of multiple sub-pixels, or may be formed on the entire display region regardless of the boundaries of the sub-pixels. Preferably, multiple third electrodes 34 are electrically connected to each other in the entire display region and can apply a common constant voltage or a certain alternating voltage to the sub-pixels. Preferably, multiple fourth electrodes 36 are electrically connected to each other in the entire display region and can apply a common constant voltage or a certain alternating voltage to the sub-pixels. Employing as the electrode structure on the counter substrate 30 side an FFS structure in which the third electrode 34 and the fourth electrode 36 are disposed via the second insulating layer 35 in between can increase the intensity of the electric field formed between the third electrode 34 and the fourth electrode 36 as compared with the case of an IPS structure in which the paired electrodes are disposed in the same layer. Thus, in displaying in the third display mode (high speed response mode), the fringe electric field formed between the third electrode 34 and the fourth electrode 36 can hold the liquid crystal molecules 21 in the vicinity of the counter substrate 30 parallel to the counter substrate 30 to increase the response speed of the liquid crystal molecules 21.

As shown in FIG. 4B, at least one of the third electrode 34 or the fourth electrode 36 includes linear electrode portions extending in a second direction D2 intersecting the first direction D1 in a plan view. With the structure in which at least one of the third electrode 34 or the fourth electrode 36 includes linear electrode portions, application of magnitudes of voltage to the third electrode and the fourth electrode can form a fringe electric field between the third electrode and the fourth electrode.

The linear electrode portions included in at least one of the third electrode 34 or the fourth electrode 36 extend in the second direction D2 intersecting the first direction D1. In operating the third display mode with this arrangement, the fringe electric field formed between the third electrode 34 and the fourth electrode 36 can hold the liquid crystal molecules 21 in the vicinity of the counter substrate 30 parallel to the counter substrate 30. The liquid crystal molecules 21 in the vicinity of the counter substrate 30 with no voltage applied have a pre-tilt angle of 10° or greater and 30° or smaller with respect to a surface of the counter substrate 30. In the third display mode, the liquid crystal molecules 21 in the vicinity of the counter substrate 30 are held parallel to the counter substrate 30, which can provide a pseudo gap-reduced state in which the cell thickness (thickness of the liquid crystal layer) seems to be reduced, to increase the response speed of the liquid crystal molecules 21. Formation of an electric field between the first electrode 12 and the second electrodes 14 in this state can provide grayscale display in a gap-reduced state, i.e., in a high speed response state. An angle θ2 formed by the first direction D1 and the second direction D2 is preferably 60° or greater and 90° or smaller. The lower limit of the angle θ2 is more preferably 80°.

One of the third electrode 34 and the fourth electrode 36 may include linear electrode portions and the other may be a solid electrode, or both of the third electrode 34 and the fourth electrode 36 may include linear electrode portions. In terms of increasing the yield, both of the third electrode 34 and the fourth electrode 36 preferably include linear electrode portions.

Hereinafter, the case is described in which both of the third electrode 34 and the fourth electrode 36 include linear electrode portions extending in the second direction intersecting the first direction in a plan view as shown in FIG. 4B. Linear electrode portions 34a of the third electrode 34 and linear electrode portions 36a of the fourth electrode 36 are preferably parallel to each other. Herein, the term "parallel" means that the angle formed by two intersecting directions is preferably 0° to 5°, more preferably 0° to 3°, still more preferably 0° to 1°, particularly preferably 0°. Preferably, the linear electrode portions 34a and the linear electrode portions 36a both extend in the second direction D2. FIG. 1 shows an example in which the linear electrode portions of the third electrode 34 and the linear electrode portions of the fourth electrode 36 are formed in the entire display region regardless of the boundaries of the sub-pixels.

One linear electrode portion 34a of the third electrode 34 may have an electrode width $L_{34}$ of 2 µm or greater and 5 µm or smaller. The distance (slit width) $S_{34}$ between two adjacent linear electrode portions 34a may be 2 µm or greater and 5 µm or smaller. One linear electrode portion 36a of the fourth electrode 36 may have an electrode width $L_{36}$ of 2 µm or greater and 5 µm or smaller. The distance (slit width) $S_{36}$ between two adjacent linear electrode portions 36a may be 2 µm or greater and 5 µm or smaller. Preferably, the linear electrode portions 34a and the linear electrode portions 36a are alternately arranged in a plan view. The distance between one linear electrode portion 34a and a next linear electrode portion 36a may be 1 µm or smaller. Alternatively, the linear electrode portions 34a and the linear electrode portions 36a may be alternately arranged without gaps in a plan view as shown in FIG. 4B. With a small distance between one linear electrode portion 34a and a next linear electrode portion 36a in a plan view, the intensity of the electric field formed between the third electrode 34 and the fourth electrode 36 can be increased, which can increase the response speed of the liquid crystal molecules 21 in the high speed response mode.

In a front view of the liquid crystal panel 100, the color filters 32 may be disposed for the respective sub-pixels so as to be superimposed with the optical openings as shown in FIG. 1. The color filters 32 include red color filters 32R, green color filters 32G, and blue color filters 32B, for example. The color filters 32 of the same color may be repeatedly arranged in the row or column direction of the liquid crystal panel 100, for example. Even in such a case, the boundaries of the sub-pixels are shielded from light by a black matrix 33, and thus the color filters 32 seem to be disposed for the respective sub-pixels and to be superimposed with the optical openings in a front view of the liquid crystal panel 100.

As shown in FIG. 2, the counter substrate 30 may include the black matrix 33. The black matrix 33 is not limited and may be a typical product used in the field of liquid crystal display devices. For example, a black matrix made of a black resin may be used. In a plan view, the black matrix 33 may be disposed around each optical opening or may be disposed to define each optical opening.

The counter substrate 30 may include a first dielectric layer 37 between the color filters 32 and the third electrode 34. The first dielectric layer 37 can flatten the surfaces of the color filters 32 and reduce the occurrence of short circuit and open circuit of the third electrode and the fourth electrode formed above the color filters 32. The dielectric constant ε of the first dielectric layer 37 may be ε=3 to 4, for example. The first dielectric layer 37 has a thickness of preferably 0.5 µm or greater and 4 µm or smaller. With the dielectric layer having a thickness of greater than 4 µm, parallax confusion may be caused to possibly reduce the display quality. The first dielectric layer 37 may be a layer of an organic material such as an acrylic material or an inorganic material such as a silicon-based material.

The first alignment film 41 and the second alignment film 42 control the initial alignment azimuth of the liquid crystal molecules 21 with no voltage applied. The first alignment film 41 preferably aligns the liquid crystal molecules 21 parallel to the active matrix substrate 10 with no voltage applied to the liquid crystal layer 20. In terms of improving the viewing angle characteristics, use of an alignment film (horizontal alignment film) is preferred which aligns the liquid crystal molecules 21 parallel to a surface of the active matrix substrate 10. The expression "aligns parallel to" means that the tilt angle (including the pre-tilt angle) of the liquid crystal molecules 21 is 0° to 5°, preferably 0° to 3°, more preferably 0° to 1° with respect to a reference surface. The tilt angle (including the pre-tilt angle) with respect to the active matrix substrate 10 means the angle of the major axes of the liquid crystal molecules 21 with respect to the surface of the active matrix substrate 10.

As shown in FIG. 2, the second alignment film 42 allows the angle (hereinafter, also referred to as the pre-tilt angle) of the liquid crystal molecules 21 with no voltage applied to be 10° or greater and 30° or smaller with respect to the counter substrate 30. A typical liquid crystal display device having an FFS electrode structure employs a horizontal alignment film also on the counter substrate 30 side. In contrast, the liquid crystal display device according to the embodiment, which is intended for providing the narrow viewing angle mode, employs on the counter substrate 30 side the second alignment film 42 that provides a high pre-tilt angle with respect to the counter substrate 30. With the liquid crystal molecules 21 having a pre-tilt angle of smaller than 10° with respect to the counter substrate 30, the narrow viewing angle mode cannot be achieved because the liquid crystal molecules 21 do not rise from the surface of the counter substrate 30 even when an alternating voltage is applied to the third electrode 34 and/or the fourth electrode 36 by the later-described control circuit. With the liquid crystal molecules 21 having a pre-tilt angle of greater than 30° with respect to counter substrate 30, a sufficient contrast ratio cannot be achieved in displaying in the wide viewing angle mode. In terms of achieving a higher contrast ratio in displaying in the wide viewing angle mode, the pre-tilt angle of the liquid crystal molecules 21 with respect to counter substrate 30 is preferably 20° or smaller. The expression "tilt angle (including the pre-tilt angle) with respect to the counter substrate 30" means the angle of the major axes of the liquid crystal molecules 21 with respect to the surface of the counter substrate 30.

The first alignment film 41 and the second alignment film 42 are each preferably a photoalignment film. The photoalignment film contains a photo-functional group such as an azobenzene group, a chalcone group, a cinnamate group, a coumarin group, a tolan group, a stilbene group, or a cyclobutane ring. The photo-functional group is a functional group that causes a change in its structure, such as dimerization (formation of dimers), isomerization, photo Fries rearrangement, or decomposition (cleavage) upon irradiation with light such as ultraviolet light or visible light (electromagnetic waves, preferably polarized light, more preferably polarized ultraviolet light, particularly preferably linearly polarized ultraviolet light), to exert alignment controlling force to liquid crystal molecules.

The liquid crystal display device according to the embodiment may include a backlight on the back surface of the liquid crystal panel 100. Examples of the backlight include an edge-lit backlight and a direct-lit backlight. Examples of the edge-lit backlight include a backlight having the structure disclosed in "The Society for Information Display ((U.S.), 2010, Volume 10, Issue 1, Pages 218 to 221)". The edge-lit backlight may include a light guide plate, a light source on a side surface of the light guide plate, and a reflector on the back surface of the light guide plate. The light source may be disposed on each of the two facing side surfaces of the light guide plate. Between the light guide plate and the liquid crystal panel 100 may be disposed an optical film (3D film) providing different luminances according to the viewing angle range in a front view of the liquid crystal panel. The 3D film may be the 3D film disclosed in "The Society for Information Display".

The control circuit switches between application of alternating voltage and application of constant voltage to the third electrode and/or the fourth electrode according to a certain display mode selected from the first display mode (also referred to as the narrow viewing angle mode) which allows a first image to be observable in a narrow viewing angle range including the normal direction of the liquid crystal panel, the second display mode (also referred to as the wide viewing angle mode) which allows the first image to be observable in a wide viewing angle range including the narrow viewing angle range, and the third display mode (also referred to as the high speed response mode) which provides a higher response speed of the liquid crystal molecules than the first display mode and the second display mode.

Herein, in a plan view of the liquid crystal panel with the absorption axis 61A of the first polarizer 61 defined at the 0°-180° azimuths and the absorption axis 62A of the second polarizer 62 defined at the 90°-270° azimuths, the top-bottom directions mean the 0°-180° azimuths, the left-right directions mean the 90°-270° azimuths, the oblique direction means at least one of the 45° azimuth, the 135° azimuth, the 225° azimuth, or the 315° azimuth.

In the narrow viewing angle range, the contrast ratio is preferably lower than 2 when the liquid crystal panel is observed at a certain polar angle in at least the top-bottom directions (0°-180° azimuths) or the left-right azimuth (90°-270° azimuths). The polar angle is herein expressed according to the definition in which the direction vertical to the surface of the liquid crystal panel is defined as a polar angle of 0° and the direction parallel to the surface of the panel as a polar angle of 90°. The polar angle that allows the contrast ratio to be lower than 2 is preferably 60° or greater, more preferably 45° or greater, still more preferably 30° or greater, for example. The narrow viewing angle mode is preferably a mode that allows the contrast ratio to be lower than 2 at at least two or more azimuths selected from the azimuth angles 0°, 45°, 90°, 135°, 180°, 225°, 270°, or 315° in a polar angle range of 60° or greater and 90° or smaller. The lower limit of the polar angle is more preferably 45°, still more preferably 30°. The wide viewing angle range means the range having a polar angle greater than that in the narrow viewing angle range. The wide viewing angle mode is preferably a mode that allows the contrast ratio to be higher than 2 at at least four or more azimuths selected from the azimuth angles 0°, 45°, 90°, 135°, 180°, 225°, 270°, or 315° in a polar angle range of 60° or greater and smaller than 90°. The lower limit of the polar angle is more preferably 45°, still more preferably 30°.

The response speed can be evaluated according to the sum (tr+tf) (response sum) of the rising response speed tr (ms) and the falling response speed tf (ms). The rising response speed can be used for evaluating the response property in switching from black display to white display, and the falling response speed can be used for evaluating the response property in switching from white display to black display. A smaller response sum indicates a higher response speed. When the maximum value of the transmittance is defined as a transmittance ratio of 100%, the rising response speed is the time taking for a change from a transmittance ratio of 10% to a transmittance ratio of 90%, for example. When the maximum value of the transmittance is defined as a transmittance ratio of 100%, the falling response speed is the time taking for a change from a transmittance ratio of 90% to a transmittance ratio of 10%, for example. The third display mode (also referred to as the high speed response mode) provides a response sum of preferably shorter than 14 ms, more preferably 12 ms or shorter. The first display mode and the second display mode provide a response sum of 14 ms or longer, for example. The upper limit of the response sum in the first display mode and the second display mode is not limited and may be 22 ms, for example.

Figure 5:
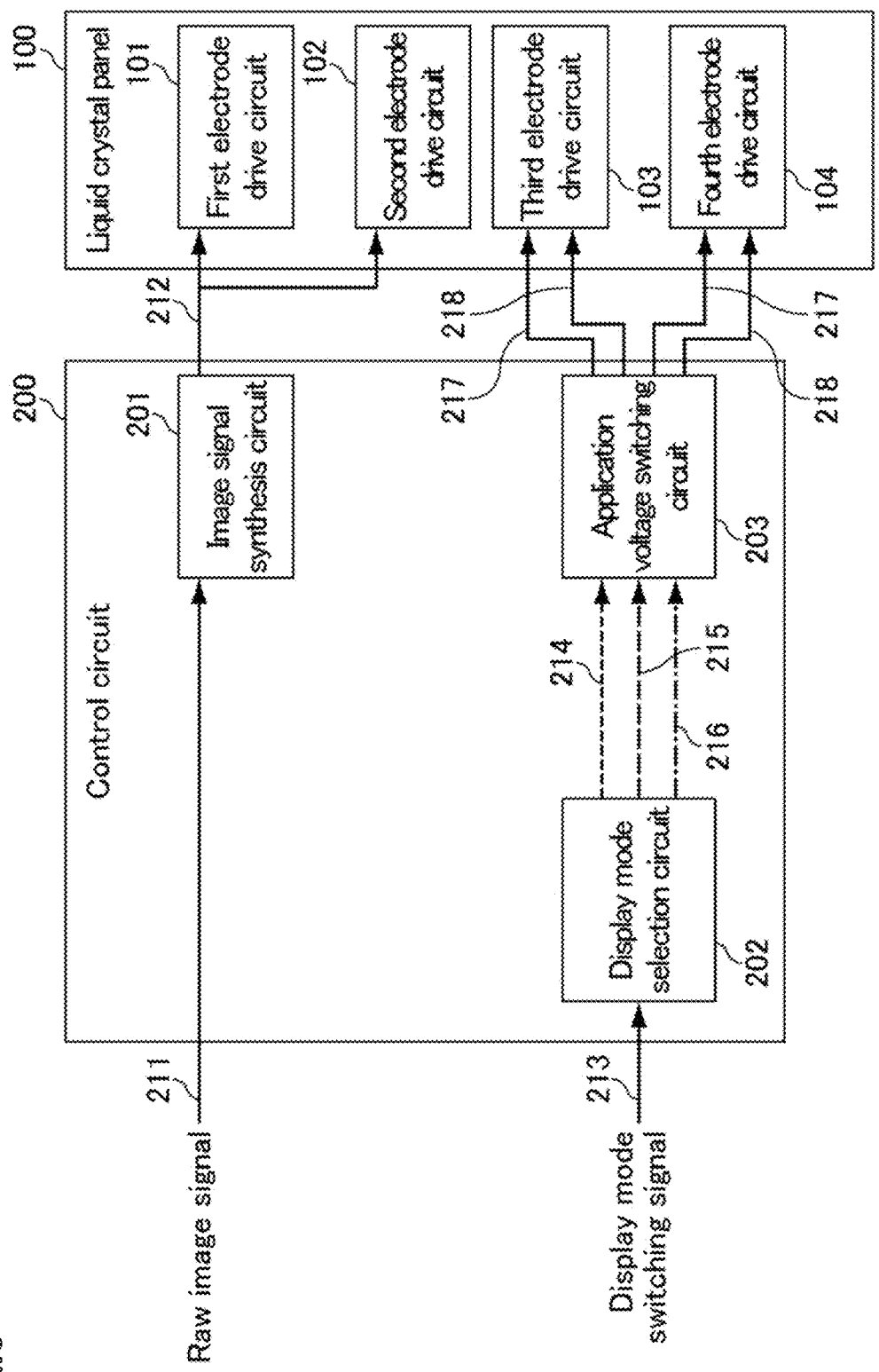
FIG. 5 is a block diagram schematically showing display methods for a first display mode, a second display mode, and a third display mode.

FIG. 5 is a block diagram schematically showing display methods for the first display mode, the second display mode, and the third display mode. As shown in FIG. 5, the liquid crystal display device according to the embodiment includes the liquid crystal panel 100 and a control circuit 200. The liquid crystal panel 100 may include a first electrode drive circuit 101 that applies voltage to the first electrode 12, a second electrode drive circuit 102 that applies voltage to the second electrodes 14, a third electrode drive circuit 103 that applies voltage to the third electrode 34, and a fourth electrode drive circuit 104 that applies voltage to the fourth electrode 36. The control circuit 200 may include an image signal synthesis circuit 201, a display mode selection circuit 202, and an application voltage switching circuit 203.

The image signal synthesis circuit 201, for example, receives a raw image signal 211 for displaying a desired image and outputs an image signal 212 corresponding to the received raw image signal 211 to the first electrode drive circuit 101 and the second electrode drive circuit 102.

The display mode selection circuit 202 receives a display mode switching signal 213 for switching between the first display mode, the second display mode, and the third display mode. When the first display mode is selected, the display mode selection circuit 202 outputs a first display mode selection signal 214 to the application voltage switching circuit 203. When the second display mode is selected, the display mode selection circuit 202 outputs a second display mode selection signal 215 to the application voltage switching circuit 203. When the third display mode is selected, the display mode selection circuit 202 outputs a third display mode selection signal 216 to the application voltage switching circuit 203.

The application voltage switching circuit 203 inputs an alternating signal 217 or a constant voltage signal 218 to the third electrode drive circuit 103 according to the received display mode selection signal so as to switch between application of alternating voltage and application of constant voltage to the third electrode 34. The application voltage switching circuit 203 inputs the alternating signal 217 or the constant voltage signal 218 to the fourth electrode drive circuit 104 according to the received display mode selection signal so as to switch between application of alternating voltage and application of constant voltage to the fourth electrode 36.

When receiving the first display mode selection signal 214 from the display mode selection circuit 202, the application voltage switching circuit 203 outputs the constant voltage signal 218 to the third electrode drive circuit 103 and the fourth electrode drive circuit 104, whereby a constant voltage common to the first electrode 12 or the second electrodes 14 is applied to the third electrode 34 and the fourth electrode 36. When receiving the second display mode selection signal 215 from the display mode selection circuit 202, the application voltage switching circuit 203 outputs the alternating signal 217 to the third electrode drive circuit 103 and the fourth electrode drive circuit 104, whereby a certain alternating voltage is applied to the third electrode 34 and the fourth electrode 36. When receiving the third display mode selection signal 216 from the display mode selection circuit 202, the application voltage switching circuit 203 outputs the constant voltage signal 218 to one of the third electrode drive circuit 103 and the fourth electrode drive circuit 104, whereby a constant voltage common to the first electrode 12 or the second electrodes 14 is applied to the one of the third electrode 34 and the fourth electrode 36. The application voltage switching circuit 203 also outputs the alternating signal 217 to the other of the third electrode drive circuit 103 and the fourth electrode drive circuit 104, whereby a certain alternating voltage is applied to the other of the third electrode 34 and the fourth electrode 36.

The constant voltage is a reference voltage for driving the liquid crystal display device. For example, a certain voltage may be applied to the first electrode 12 or the second electrodes 14, or the first electrode 12 or the second electrodes 14 may be grounded. In the case where the constant voltage is applied to the third electrode 34 or the fourth electrode 36, the corresponding electrode may be electrically connected to the first electrode 12 or the second electrodes 14; the constant voltage common to the first electrode 12 or the second electrodes 14 may be applied to the corresponding electrode through a signal line different from the first electrode 12 or the second electrodes 14; or the third electrode 34 or the fourth electrode 36 may be grounded.

Figure 6:
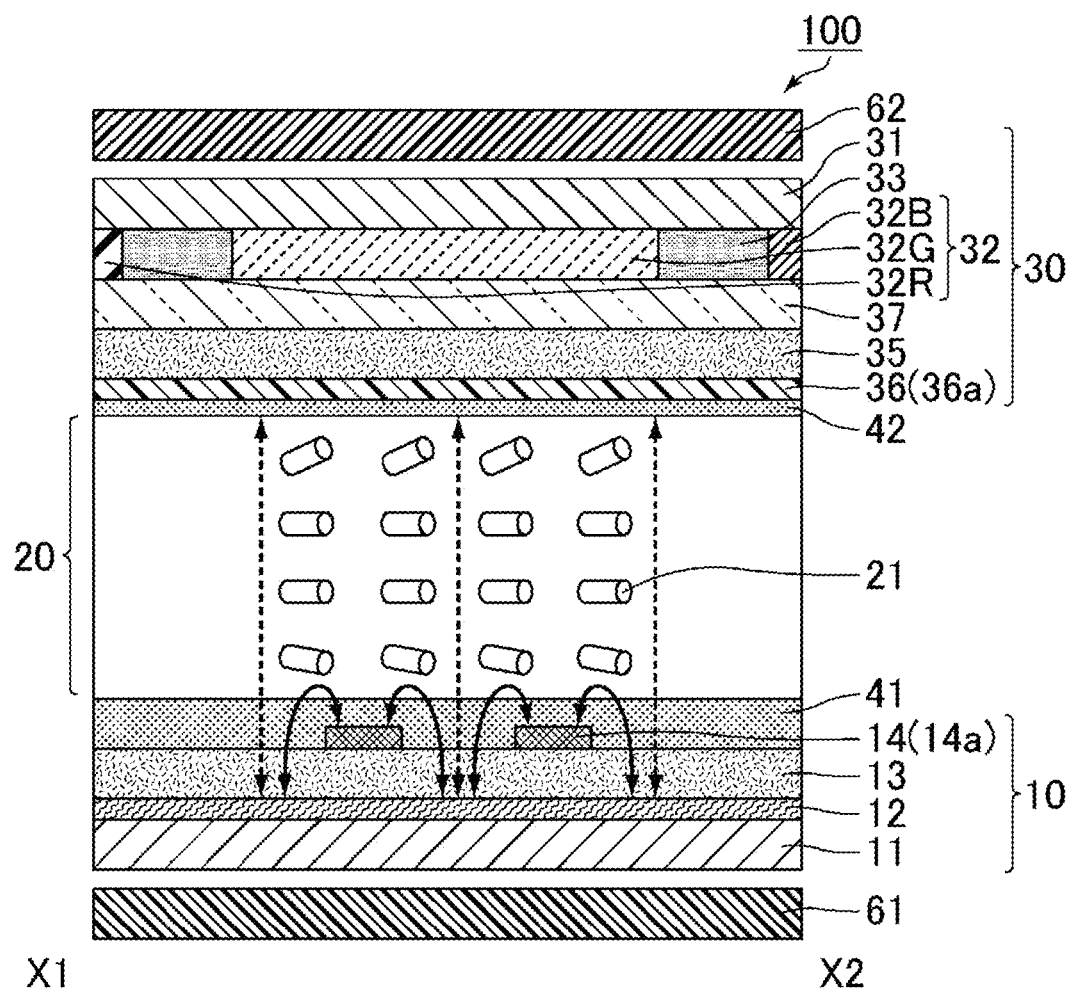
FIG. 6 is a schematic cross-sectional view of one sub-pixel in white display in the narrow viewing angle mode.
Figure 7:
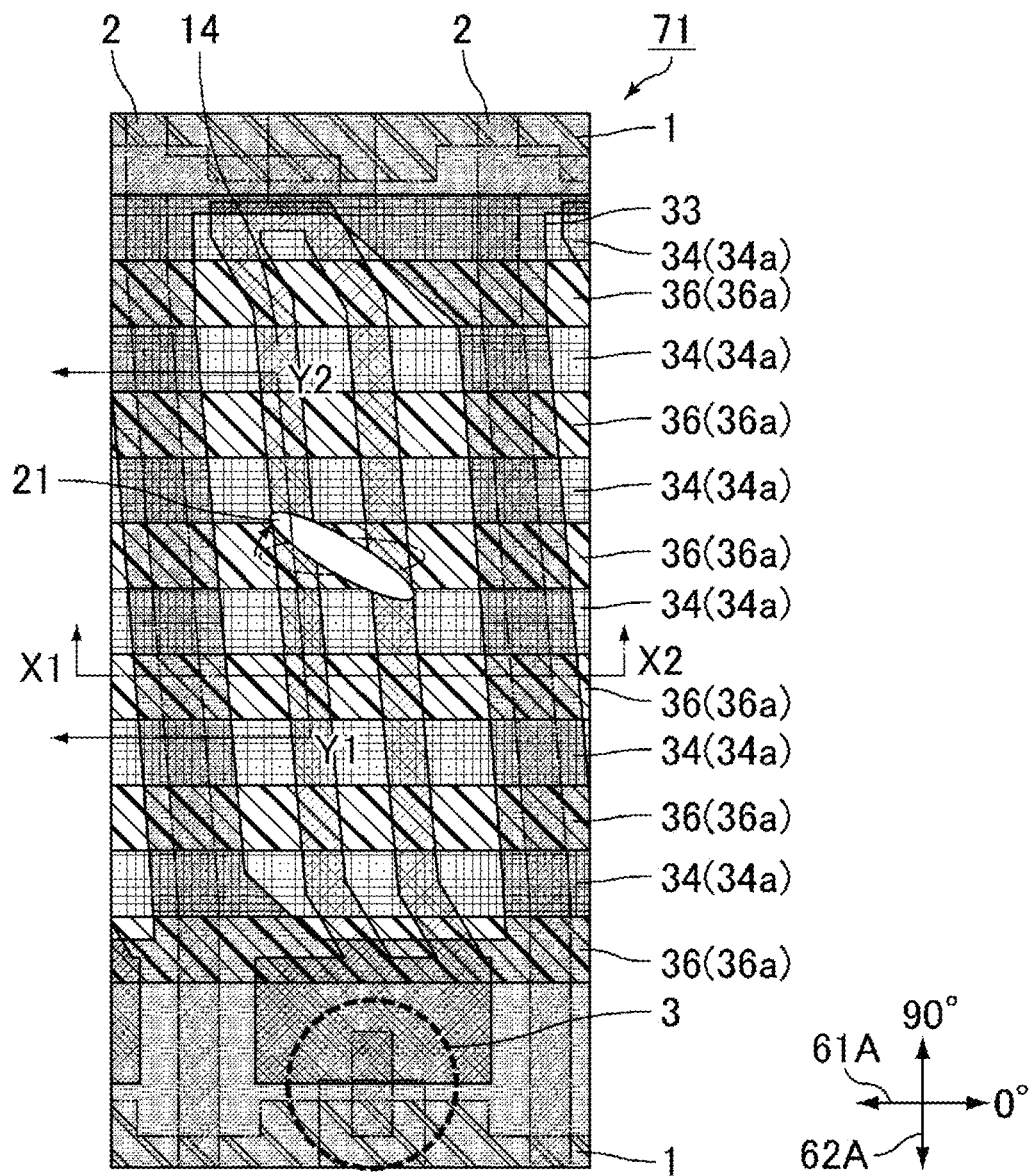
FIG. 7 is a schematic plan view of one sub-pixel in white display in the narrow viewing angle mode.
Figure 8:
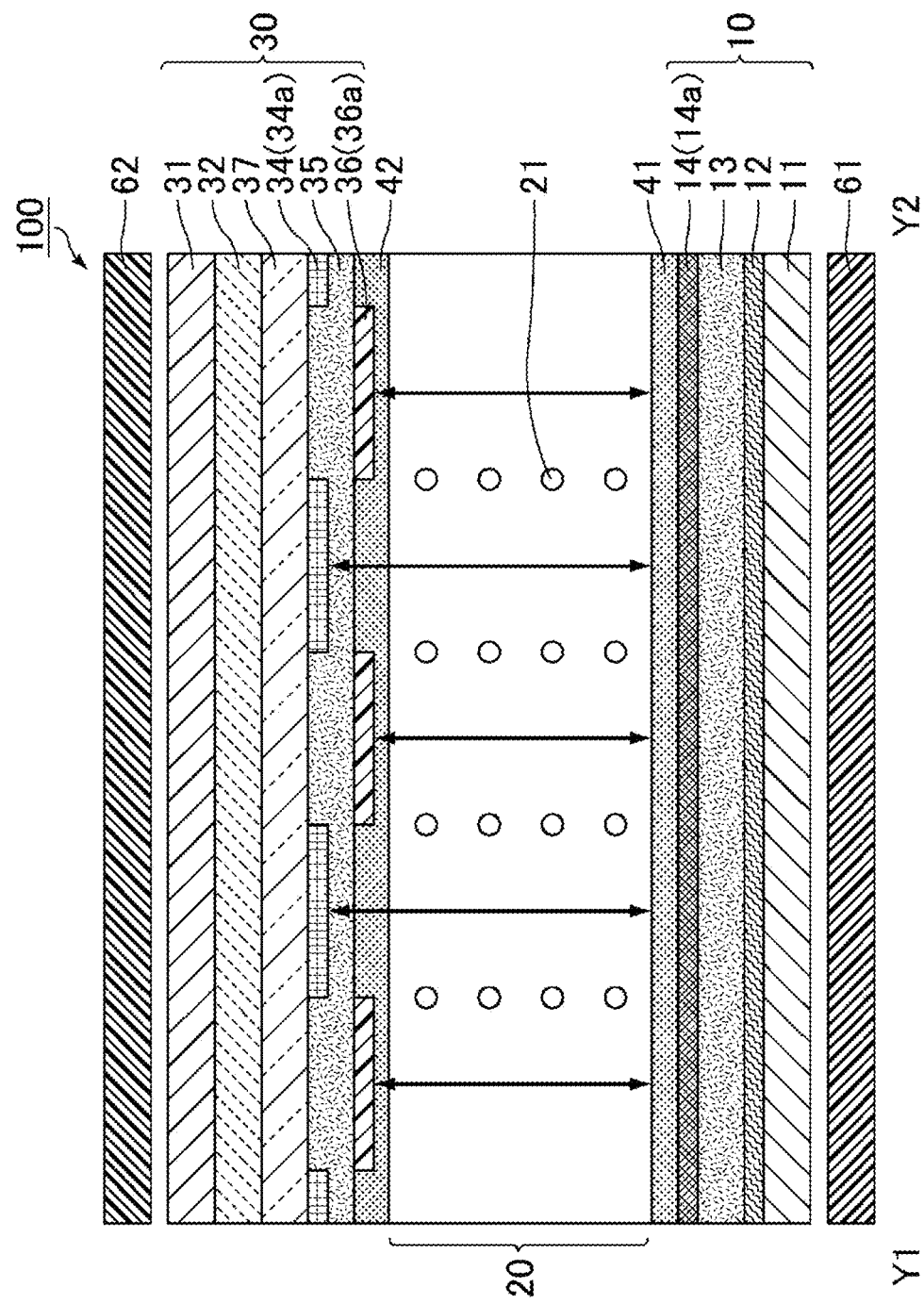
FIG. 8 is a schematic cross-sectional view of one sub-pixel in black display in the wide viewing angle mode.
Figure 9:
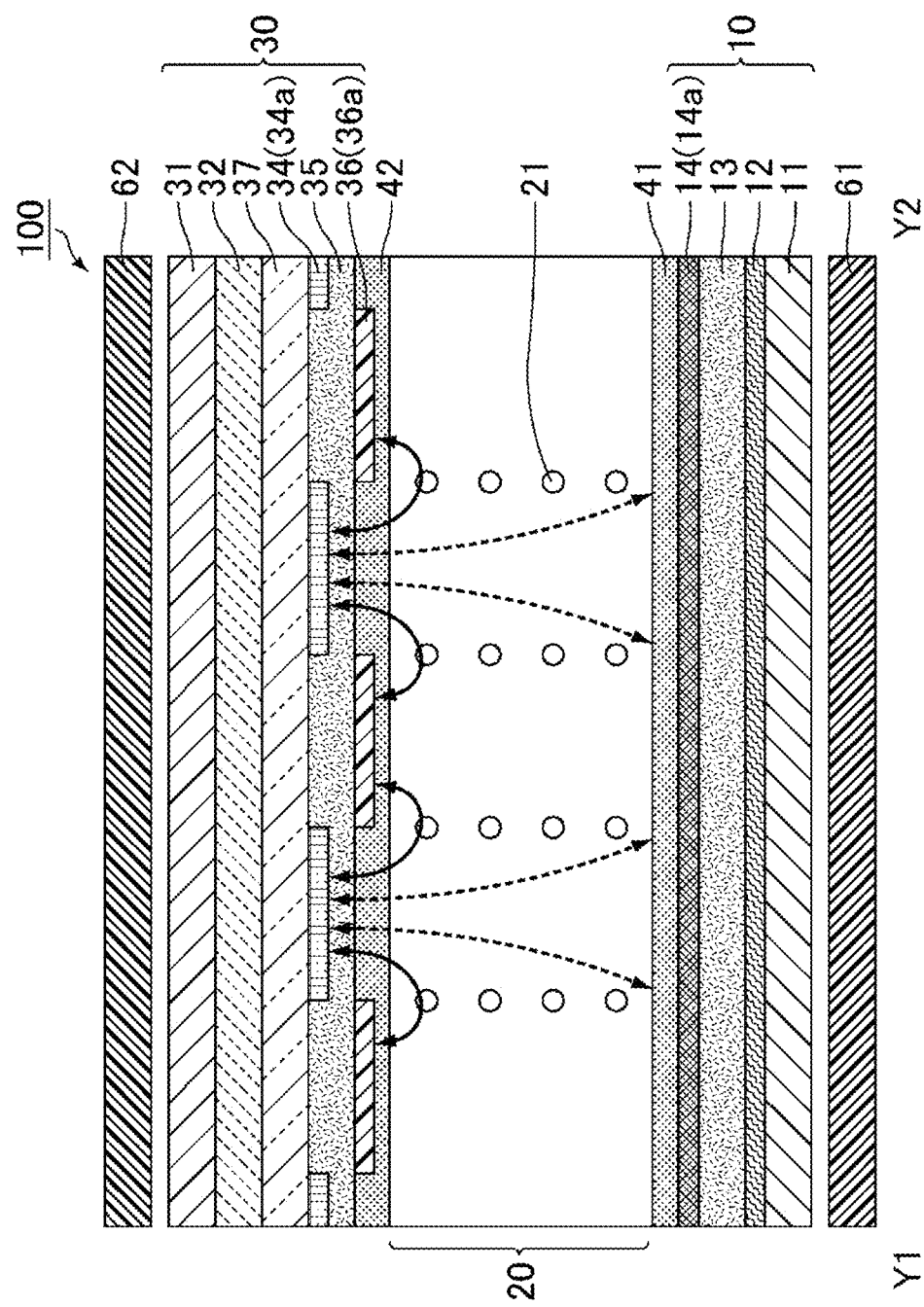
FIG. 9 is a schematic cross-sectional view of one sub-pixel in black display in the high speed response mode.

Hereinafter, display methods for the narrow viewing angle mode, the wide viewing angle mode, and the high speed response mode are described with reference to FIG. 2, FIG. 3, FIG. 4A, and FIG. 6 to FIG. 9. As described below, switching between the narrow viewing angle mode, the wide viewing angle mode, and the high speed response mode can be made by controlling the voltage applied to the third electrode 34 and the fourth electrode 36. FIG. 2 and FIG. 3 each are also a schematic cross-sectional view of one sub-pixel in black display in the narrow viewing angle mode. FIG. 4A is also a schematic plan view of one sub-pixel in black display in the narrow viewing angle mode. FIG. 6 is a schematic cross-sectional view of one sub-pixel in white display in the narrow viewing angle mode. FIG. 7 is a schematic plan view of one sub-pixel in white display in the narrow viewing angle mode. FIG. 6 is a schematic cross-sectional view taken along the line X1-X2 in FIG. 7. FIG. 8 is a schematic cross-sectional view of one sub-pixel in black display in the wide viewing angle mode. FIG. 9 is a schematic cross-sectional view of one sub-pixel in black display in the high speed response mode. The term "black display" means a display state with a minimum luminance (grayscale of 0), and the term "white display" means a display state with a maximum luminance (grayscale of 255).

In the case of providing black display in the narrow viewing angle mode, for example, the control circuit 200 applies a constant voltage (common voltage) to the second electrodes 14 and the first electrode 12 and also applies the constant voltage common to the first electrode 12 and the second electrodes 14 to the third electrode 34 and the fourth electrode 36. Here, no electric field is generated in the liquid crystal layer 20, and thus the liquid crystal molecules 21 are aligned at the initial alignment azimuth. As shown in FIG. 2 and FIG. 3, preferably, with no voltage applied to the liquid crystal layer 20, the liquid crystal molecules 21 in the vicinity of the counter substrate 30 have a pre-tilt angle of 10° or greater and 30° or smaller with respect to the surface of the counter substrate 30, and the liquid crystal molecules 21 in the vicinity of the active matrix substrate 10 are aligned parallel to the surface of the active matrix substrate 10. FIG. 4A shows the case where the alignment azimuth of the liquid crystal molecules 21 is parallel to the absorption axis 61A of the first polarizer 61. With the alignment azimuth of the liquid crystal molecules 21 set to be parallel to the absorption axis 61A of the first polarizer 61 or the absorption axis 62A of the second polarizer 62 in a plan view, black display is provided without light from the back surface of the liquid crystal panel passing through the liquid crystal layer 20.

In the case of providing grayscale display in the narrow viewing angle mode, for example, the control circuit 200 applies a constant voltage to one of the first electrode 12 and the second electrodes 14 and applies a voltage different from the common voltage to the other while applying to the third electrode 34 and the fourth electrode 36 the constant voltage common to the first electrode 12 or the second electrodes 14. For example, when a common voltage is applied to the second electrodes 14, the alternating voltage applied to the first electrode is adjusted from 0 V to 6 V relative to the common voltage while applying the common voltage to the third electrode 34 and the fourth electrode 36, whereby grayscale display from black display to white display can be provided. As shown in FIG. 6, a fringe electric field is formed between the first electrode 12 and the second electrodes 14. The fringe electric field formed between the first electrode 12 and the second electrodes 14 rotates the liquid crystal molecules 21 in the plane of the liquid crystal layer 20 and thereby changes the alignment azimuth of the liquid crystal molecules 21 from the initial alignment azimuth as shown in FIG. 7. Thereby, the direction of the major axes of the liquid crystal molecules 21 forms angles with the absorption axis 61A of the first polarizer and with the absorption axis 62A of the second polarizer, to allow light to pass through from the back surface of the liquid crystal panel. Here, an electric field is formed between the first electrode 12 and the third electrode 34 and between the first electrode 12 and the fourth electrode 36 in the thickness direction of the liquid crystal layer 20. This electric field is weaker than the fringe electric field and thus hardly changes the inclination angle (tilt angle) of the liquid crystal molecules 21 with respect to the counter substrate 30. Accordingly, the first image is observable in the narrow viewing angle range, while the first image can be less observable in the wide viewing angle range due to a change caused to the image, such as an extremely reduced contrast ratio.

In the case of providing black display in the wide viewing angle mode, for example, the control circuit 200 execute operation (a) of applying a common voltage to the second electrodes 14 and the first electrode 12 and applying an alternating voltage the third electrode 34 and the fourth electrode 36 or operation (b) of applying a common voltage to one of the third electrode 34 and the fourth electrode 36 and applying an alternating voltage to the other of the third electrode 34 and the fourth electrode 36. In executing the operation (a), as shown in FIG. 8, an electric field is formed between a group including the first electrodes 12 and the second electrodes 14 and a group including the third electrode 34 and the fourth electrode 36. In executing the operation (b), an electric field is formed between the third electrode 34 or the fourth electrode 36 to which an alternating voltage is applied and the first electrodes 12 and between the alternating-voltage-applied electrode and the second electrodes 14. Since the electric field is formed in the thickness direction of the liquid crystal layer 20, the tilt angle of the liquid crystal molecules 21 with respect to the counter substrate 30 is smaller than the pre-tilt angle with no voltage applied. In executing the operation (a), the difference between the effective value of the alternating voltage applied to the third electrode 34 and the effective value of the alternating voltage applied to the fourth electrode 36 is preferably 1 V or less. The alignment azimuth in a plan view of the liquid crystal molecules in black display in the narrow viewing angle mode is similar to that shown in FIG. 4A and thus is not described.

In the case of providing grayscale display under the operation (a) in the wide viewing angle mode, for example, the control circuit 200 applies a common voltage to one of the first electrode 12 and the second electrodes 14 and applies a voltage different from the common voltage to the other while applying an alternating voltage to the third electrode 34 and the fourth electrode 36. For example, a common voltage is applied to the second electrodes 14 and the alternating voltage applied to the first electrode is adjusted from 0 V to 6 V relative to the common voltage while applying to the third electrode 34 and the fourth electrode 36 an alternating voltage of about 5 to 10 V relative to the common voltage, whereby grayscale display from black display to white display can be provided.

In the case of providing grayscale display under the operation (b) in the wide viewing angle mode, for example, the control circuit 200 applies a common voltage to one of the first electrode 12 and the second electrodes 14 and applies a voltage different from the common voltage to the other while applying the common voltage to one of the third electrode 34 and the fourth electrode 36 and applying an alternating voltage to the other of the third electrode 34 and the fourth electrode 36. In executing the operation (b), the difference between the effective value of the voltage (alternating voltage or common voltage) applied to the third electrode 34 and the effective value of the voltage (alternating voltage or common voltage) applied to the fourth electrode 36 is preferably less than 10 V, more preferably 5 V or less. For example, a common voltage is applied to the second electrodes 14 and the alternating voltage applied to the first electrode is adjusted from 0 V to 6 V relative to the common voltage while applying an alternating voltage of about 5 to 10 V relative to the common voltage to the third electrode 34 and applying the common voltage to the fourth electrode 36, whereby grayscale display from black display to white display can be provided.

Similarly to the narrow viewing angle mode, in the wide viewing angle mode, the fringe electric field formed between the first electrode 12 and the second electrodes 14 rotates the liquid crystal molecules 21 in the plane of the liquid crystal layer 20, whereby light from the back surface of the liquid crystal panel is passed through the liquid crystal layer 20. Meanwhile, as described in the above, in the wide viewing angle mode, the electric field formed in the thickness direction of the liquid crystal layer 20 allows the liquid crystal molecules 21 to have a tilt angle smaller than the pre-tilt angle with no voltage applied, with respect to the counter substrate 30. Thus, in the wide viewing angle mode in which the first image is observable in the wide viewing angle range, the liquid crystal molecules 21 are preferably aligned parallel to the counter substrate 30. The schematic plan view of one sub-pixel in white display in the wide viewing angle mode is similar to FIG. 7 and thus is not described.

In the case of providing black display in the high speed response mode, for example, the control circuit 200 applies a common voltage to the second electrodes 14 and the first electrode 12, applies to one of the third electrode 34 and the fourth electrode 36 the constant voltage common to the first electrode 12 and the second electrodes 14, and applies an alternating voltage to the other of the third electrode 34 and the fourth electrode 36. As shown in FIG. 9, a fringe electric field is formed between the third electrode 34 and the fourth electrode 36. The fringe electric field formed between the third electrode 34 and the fourth electrode 36 holds the liquid crystal molecules 21 in the vicinity of the counter substrate 30 parallel to the counter substrate 30.

In the high speed response mode, the alternating voltage applied to the other of the third electrode 34 and the fourth electrode 36 is greater than the alternating voltage applied to the other of the third electrode 34 and the fourth electrode 36 under the operation (b) in the wide viewing angle mode. In other words, in the high speed response mode, the effective value of the alternating voltage applied to the other of the third electrode 34 and the fourth electrode 36 is greater than the effective value of the alternating voltage applied to the third electrode 34 or the fourth electrode 36 under the operation (b) in the wide viewing angle mode. The effective value of the alternating voltage applied to the other electrode is preferably greater than the effective value of the alternating voltage applied to one of the third electrode 34 and the fourth electrode 36 under the operation (b) in the wide viewing angle mode by 10 V or more, more preferably 15 V or more. Meanwhile, in the high speed response mode, the magnitude of the alternating voltage applied to the other of the third electrode 34 and the fourth electrode 36 is not limited in relation to the magnitude of the alternating voltage applied to the third electrode 34 and the fourth electrode 36 under the operation (a) in the wide viewing angle mode. The alignment azimuth in a plan view of the liquid crystal molecules in black display in the high speed response mode is similar to that shown in FIG. 4A and thus is not described.

In the high speed response mode, the difference between the effective value of the voltage (alternating voltage or common voltage) applied to the third electrode 34 and the effective value of the voltage (alternating voltage or common voltage) applied to the fourth electrode 36 is preferably 10 V or more. In terms of further increasing the response speed of the liquid crystal molecules, the difference is more preferably 15 V or more, still more preferably 20 V or more. The upper limit of the difference between the effective value of the voltage applied to the third electrode 34 and the effective value of the voltage applied to the fourth electrode 36 is 50 V, for example.

In providing grayscale display in the high speed response mode, the control circuit 200, for example, applies a common voltage to one of the first electrode 12 and the second electrodes 14 and applies a voltage different from the common voltage to the other while applying to one of the third electrode 34 and the fourth electrode 36 the constant voltage common to first electrode 12 or the second electrodes 14 and applying an alternating voltage to the other of the third electrode 34 and the fourth electrode 36.

In the high speed response mode, the control circuit 200 may apply to the third electrode 34 the constant voltage common to the first electrode 12 or the second electrodes 14 and may apply to the fourth electrode 36 an alternating voltage higher than the alternating voltage applied to the other of the third electrode 34 and the fourth electrode 36 in the wide viewing angle mode. For example, a common voltage is applied to the second electrodes 14 and the alternating voltage applied to the first electrode is adjusted to 0 to 6 V relative to the common voltage while applying the common voltage to the third electrode 34 and applying to the fourth electrode 36 an alternating voltage of 10 to 20 V relative to the common voltage, whereby grayscale display from black display to white display can be provided.

Also, in the high speed response mode, the control circuit 200 may apply to the fourth electrode 36 the constant voltage common to the first electrode 12 or the second electrodes 14 and may apply to the third electrode 34 an alternating voltage higher than the alternating voltage applied to the other of the third electrode 34 and the fourth electrode 36 in the wide viewing angle mode. For example, a common voltage is applied to the second electrodes 14 and the alternating voltage applied to the first electrode is adjusted to 0 to 6 V relative to the common voltage while applying to the third electrode 34 an alternating voltage of 10 to 20 V relative to the common voltage and applying the common voltage to the fourth electrode 36, whereby grayscale display from black display to white display can be provided. Of the third electrode 34 and the fourth electrode 36 in the counter substrate 30, applying an alternating voltage to the third electrode 34 that is farther from the liquid crystal layer 20 can weaken the electric field formed in the thickness direction in the liquid crystal layer 20 as compared with the case of applying an alternating voltage to the fourth electrode 36 that is closer to the liquid crystal layer 20 and therefore can achieve better horizontal alignment of the liquid crystal molecules 21. Accordingly, applying an alternating voltage to the third electrode 34 can more reduce or prevent light leakage in black display than the case of applying an alternating voltage to the fourth electrode 36, and thus presumably can further reduce the luminance in black display. Applying an alternating voltage to the third electrode 34, which achieves a lower luminance in black display, can more increase the front contrast ratio.

Similarly to the narrow viewing angle mode, the fringe electric field formed between the first electrode 12 and the second electrodes 14 rotates the liquid crystal molecules 21 in the plane of the liquid crystal layer 20, whereby light from the back surface of the liquid crystal panel is passed through the liquid crystal display panel 20. Meanwhile, in the high speed response mode, the fringe electric field formed between the third electrode 34 and the fourth electrode 36 holds the liquid crystal molecules 21 in the vicinity of the counter substrate 30 parallel to the counter substrate 30. This can achieve a higher response speed of the liquid crystal molecules than in the narrow viewing angle mode and the wide viewing angle mode. In the high speed response mode, the liquid crystal molecules 21 are preferably aligned parallel to the counter substrate 30. Similarly to the wide viewing angle mode, the high speed response mode allows the first image to be observable in the wide viewing angle range. The schematic plan view of one sub-pixel in white display in the high speed response mode is similar to FIG. 7 and thus is not described.

The liquid crystal display device according to the embodiment switches the mode from the second display mode (wide viewing angle mode) or the third display mode (high speed response mode) to the first display mode (narrow viewing angle mode) as described above to ensure high privacy by making its liquid crystal panel less observable from the left-right directions. Furthermore, the liquid crystal display device according to the embodiment makes its liquid crystal panel less observable from the left-right and oblique directions to ensure even higher privacy by incorporating the later-described veil-view function in addition to the display mode switching. The first display mode alone can lead to the narrow viewing angle effect in the left-right directions and, although limitative, can also lead to the effect at an oblique azimuth of 45 degrees. Meanwhile, the veil-view function as described in JP 2011-253206 A alone can lead to the narrow viewing angle effect at an oblique azimuth of 45 degrees, but the narrow viewing angle effect is limitative at two certain azimuths (left-right azimuths). Thus, combining these functions achieves a complementary effect, leading to an excellent narrow viewing angle effect in the left-right directions and 45 degrees azimuths. An invention based on this finding is described below.

The liquid crystal display device according to the embodiment can switch between the narrow viewing angle mode, the wide viewing angle mode, and the high speed response mode, and thus can be used for video game applications requiring high response speed. The liquid crystal molecules have a high response speed in the high speed response mode, and thus afterimage is less likely to be observed even when an image moves in the display screen. Moreover, the liquid crystal display device according to the embodiment can achieve the third display mode that increases the response speed of the liquid crystal molecules 21 in a low temperature environment (e.g., −20° C. to 0° C.) as well as a room temperature environment (e.g., 15° C. to 35° C.). Accordingly, the liquid crystal display device can switch between the three different display modes even in an environment with significant temperature changes. Therefore, the liquid crystal display device according to the embodiment can also be suitably used as a vehicle-mounted display.

In use as a vehicle-mounted display, for example, the liquid crystal display device is placed such that the 0°-180° azimuths of the liquid crystal panel come to the top-bottom directions of the vehicle and that the normal direction of the liquid crystal panel is faced to the front passenger seat. Thereby, in the first display mode, the first image is observable from the front passenger seat side, while the first image is less observable from the driver seat side. Here, the contrast ratio of the display screen observed from the driver seat side decreases and the display screen looks unnaturally bright and white to make the first image less perceivable. The color of the vehicle-mounted display should match the color of the vehicle interior. Thus, the unnatural white color of the display screen is not preferred in terms of aesthetic purposes. Thus, the present inventors studied the method for enhancing the privacy while darkening the display screen in the first display mode and found that the display screen can be darkened in the first display mode by using as a backlight an edge-lit backlight that includes a light guide plate, a light source on each of the two facing side surfaces of the light guide plate, a reflector on the back surface of the light guide plate, and a 3D film on the front surface of the light guide plate.

As described above, the 3D film is a film providing different luminances according to the viewing angle range in the front view of the liquid crystal panel. The 3D film has on its surface thereof convex portions such as prisms, for example, and thereby controls the angle of light emitted from the backlight toward the liquid crystal panel. The 3D film thus can allow light incident from the light sources on the light guide plate to be emitted in a certain viewing angle range. The two light sources are preferably placed on the left and right portions of the liquid crystal panel. For example, when the amount of light emitted from a portion of the surface farther from the light sources is less than the amount of light emitted from a portion of the surface closer to the light source, the backlight is disposed with one of the light sources on the driver seat side and the other on the front passenger seat side. In displaying in the first display mode, the light source on the driver seat side is turned on and the light source on the front passenger seat side is turned off, whereby the amount of light emitted from the driver seat side of the liquid crystal panel can be reduced to darken the display screen on the driver seat side and to reduce the unnatural white color to be perceived from the driver seat side. The turning on or off of the two light sources of the backlight may be controlled by the control circuit.

Hereinafter, an exemplary method for displaying an image using the veil-view function is described with reference to FIG. 10 to FIG. 15. FIG. 10, FIG. 11, FIG. 13 and FIG. 14 schematically show the first sub-pixel 70 and the second sub-pixel 71 shown in the drawings including FIG. 1.

Figure 10:
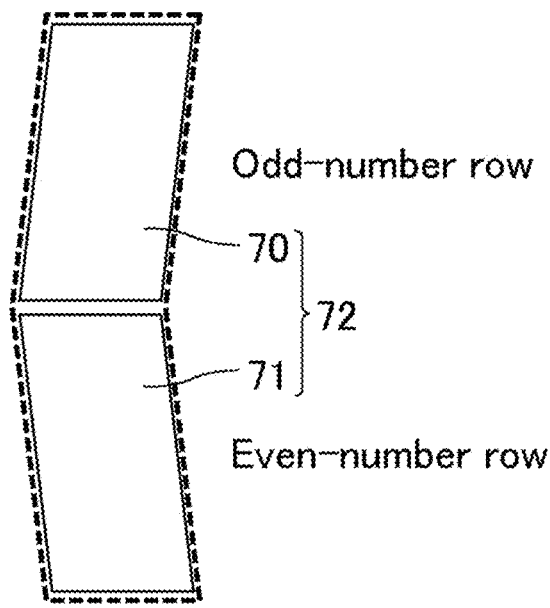
FIG. 10 is a schematic plan view of an exemplary display unit in a liquid crystal panel.
Figure 11:
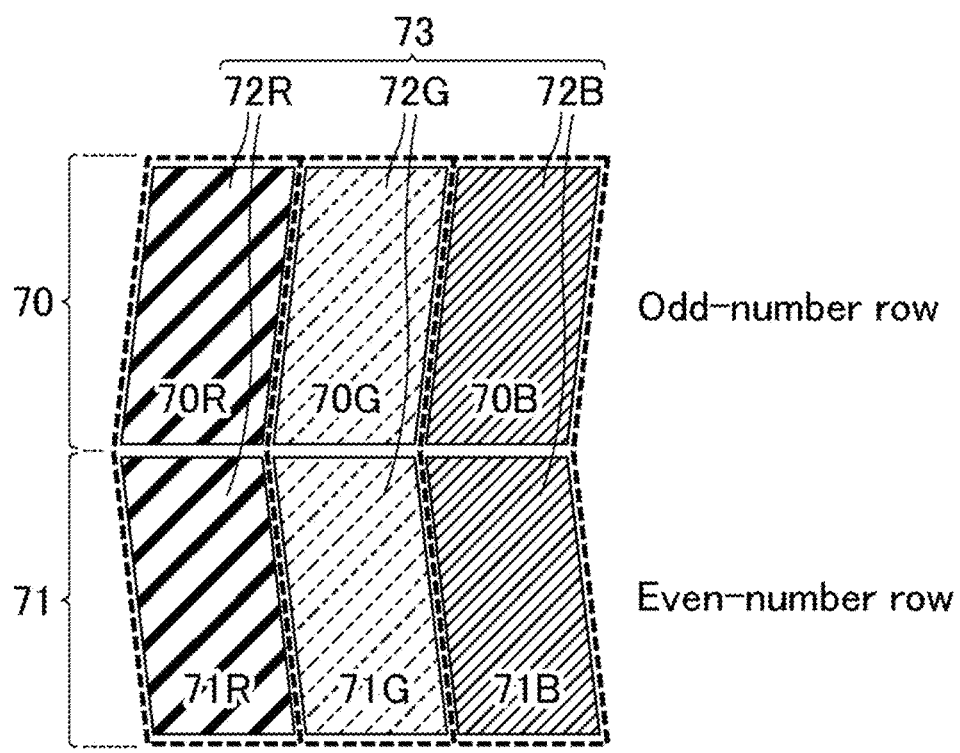
FIG. 11 is a schematic plan view of an exemplary color element for color display using the veil-view function.

FIG. 10 is a schematic plan view of an exemplary display unit in a liquid crystal panel. FIG. 11 is a schematic plan view of an exemplary color element for color display using the veil-view function. The liquid crystal panel 100 preferably includes display units 72 for displaying an image using the veil-view function. As shown in FIG. 10, the display units 72 each include a pair of sub-pixels arranged adjacent to each other, one of the sub-pixels being a first sub-pixel 70 selected from odd-number rows and the other being a second sub-pixel 71 selected from even-number rows. The first sub-pixel 70 and the second sub-pixel 71 may each be considered as one sub-pixel as shown in FIG. 1, or a combination of a first red sub-pixel 70R, a first green sub-pixel 70G, and a first blue sub-pixel 70B may be regarded as the first pixel 70 and a combination of a second red sub-pixel 71R, a second green sub-pixel 71G, and a second blue sub-pixel 71B may be regarded as the second pixel 71 as shown in FIG. 11 described later. For color display by a normal display method, the pixels including red, green, and blue pixels are independently driven. In the normal color display, the display can be provided at a resolution twice that of the color display using the veil-view function.

As shown in FIG. 11, for color display, the liquid crystal panel 100 preferably includes a red display unit 72R including a first red sub-pixel 70R and a second red sub-pixel 71R, a green display unit 72G including a first green sub-pixel 70G and a second green sub-pixel 71G, and a blue display unit 72B including a first blue sub-pixel 70B and a second blue sub-pixel 71B. The first red sub-pixel 70R and the second red sub-pixel 71R are each superimposed with a red color filter 32R in an optical opening. The first green sub-pixel 70G and the second green sub-pixel 71G are each superimposed with a green color filter 32G in an optical opening. The first blue sub-pixel 70B and the second blue sub-pixel 71B are each superimposed with a blue color filter 32B in an optical opening.

An image can be displayed using the veil-view function by, for example, dividing the luminance data value of the raw image desired to be displayed as a first image, Data 1, into two equivalent data values Data 2 and Data 3, inputting the data value of Data 1+Data 2 to the first sub-pixel 70 or the second sub-pixel 71, and inputting the data value of Data 1−Data 3 to the other. When the liquid crystal panel is observed in the narrow viewing angle range, the luminance of the first sub-pixel 70 and the luminance of the second sub-pixel 71 are spatially averaged to be recognized as the luminance of the raw image. Meanwhile, when the panel is observed in the wide viewing angle range, the luminances are recognized as the luminance Data 1+Data 2 or the luminance Data 1−Data 3.

Figure 12:
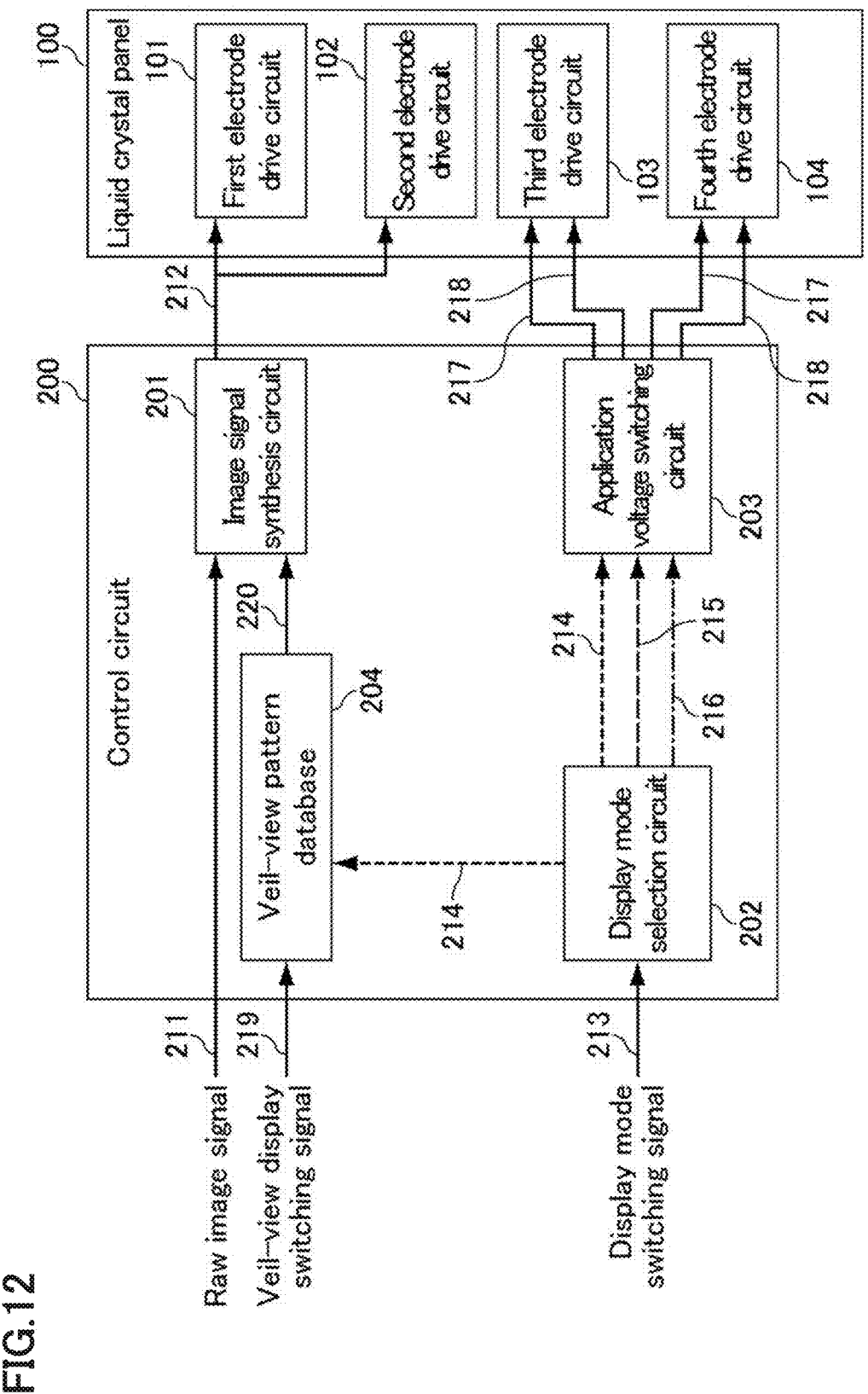
FIG. 12 is a block diagram schematically showing a method for displaying a veil-view pattern.

Hereinafter, the method of displaying a veil-view pattern is described with reference to FIG. 12. FIG. 12 is a block diagram schematically showing a method for displaying a veil-view pattern. The control circuit 200 in the first display mode inputs different image signals to the first sub-pixel 70 and the second sub-pixel 71 such that a second image different from the first image is observed in the wide viewing angle range. Such a display method is also referred to as the veil-view function. Display using the veil-view function can enhance the privacy when combined with the first display mode (narrow viewing angle mode). Thus, when receiving a first display mode selection signal 214 from the display mode selection circuit 202, a database 204 preferably outputs a veil-view pattern image signal 220 to the image signal synthesis circuit 201.

As shown in FIG. 12, the control circuit 200 may further include the database 204 in which information related to the veil-view patterns is stored. When receiving a veil-view display switching signal 219, the database 204 outputs a veil-view pattern image signal 220 to the image signal synthesis circuit 201. The image signal synthesis circuit 201 outputs an image signal 212 formed by synthesis of the raw image signal 211 and the veil-view pattern image signal 220 to the first electrode drive circuit 101 and the second electrode drive circuit 102.

For example, when the second electrode drive circuit 102 applies a constant voltage (common voltage) to the second electrodes 14, the first electrode drive circuit 101 applies different magnitudes of voltage to the first electrode(s) 12 corresponding to the first sub-pixel 70 and the second sub-pixel 71 such that the second image is observed in the wide viewing angle range. In this case, one first electrode 12 is preferably provided in each sub-pixel. When the first electrode drive circuit 101 applies a constant voltage to the first electrode 12, the second electrode drive circuit 102 applies different magnitudes of voltage to the second electrodes 14 corresponding to the first sub-pixel 70 and the second sub-pixel 71 such that the second image is observed in the wide viewing angle range.

Figure 13:
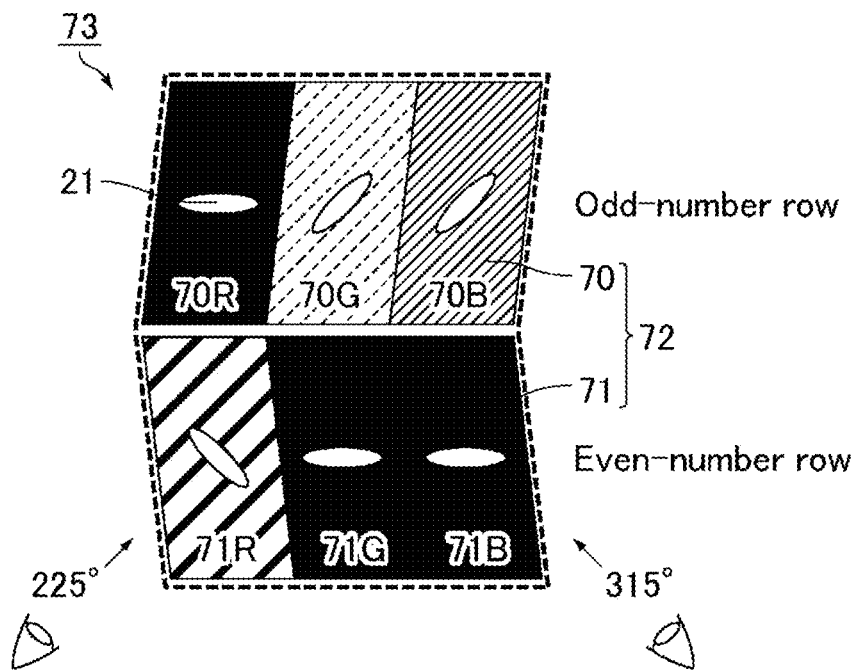
FIG. 13 is a schematic plan view of an exemplary display pattern for a color element.
Figure 14:
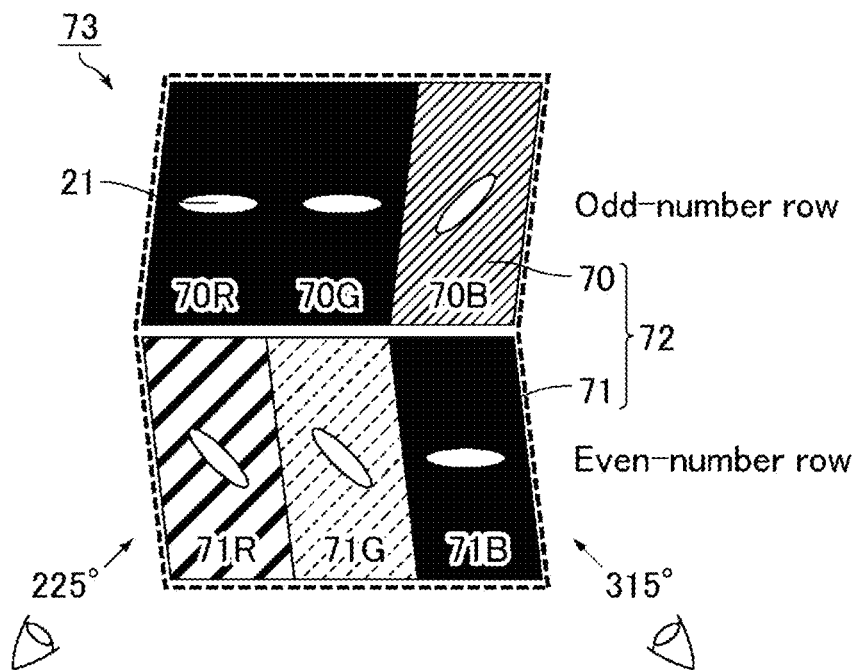
FIG. 14 is a schematic plan view of another exemplary display pattern for a color element.

FIG. 13 is a schematic plan view of an exemplary display pattern for a color element. FIG. 14 is a schematic plan view of another exemplary display pattern for a color element. A row in which the first sub-pixels 70 are arranged is also referred to as an odd-number row. A row in which the second sub-pixels 71 are arranged is also referred to as an even-number row. As shown in FIG. 13, when the first red sub-pixel 70R, the second green sub-pixel 71G, and the second blue sub-pixel 71B are in black display and the second red sub-pixel 71R, the first green sub-pixel 70G, and the first blue sub-pixel 70B are in white display, the liquid crystal molecules present in the second red sub-pixel 71R in observation at an azimuth of 225° are observed from the direction of the minor axes of the liquid crystal molecules in which the retardation is high, and thus a red color is observed. In contrast, the liquid crystal molecules in the first green sub-pixel 70G and the first blue sub-pixel 70B are observed from the direction of the major axes of the liquid crystal molecules in which the retardation is low, so that the corresponding colors are not observed. As a result, the red color is perceived. Meanwhile, in observation at an azimuth of 315°, the liquid crystal molecules in the first green sub-pixel 70G and the first blue sub-pixel 70B are observed from the direction of the minor axes of the liquid crystal molecules, so that a cyan color, which is a mixture of blue and green colors, is perceived. Here, the liquid crystal molecules in the second red sub-pixel 71R are observed from the direction of the major axes of the liquid crystal molecules, so that the corresponding color is not observed. As a result, the cyan color is perceived. As shown in FIG. 14, when the first red sub-pixel 70R, the first green sub-pixel 70G, and the second blue sub-pixel 71B are in black display and the second red sub-pixel 71R, the second green sub-pixel 71G, and the first blue sub-pixel 70B are in white display, observation at an azimuth of 225° results in perception of a yellow color, which is a mixture of red and green colors, and observation at an azimuth of 315° results in perception of a blue color.

Figure 15:
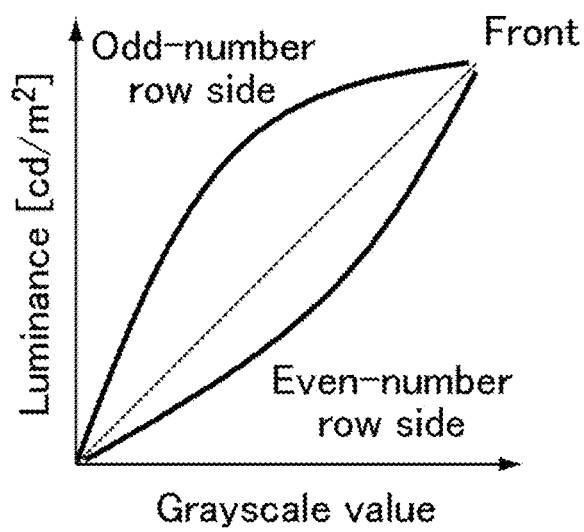
FIG. 15 shows an example of γ curves of a liquid crystal panel.

When the display pattern of the color elements shown in FIG. 13 and the display pattern of the color elements shown in FIG. 14 are combined, observation from the direction normal to the liquid crystal panel (from the front) results in observation of white display. FIG. 15 shows an example of γ curves of a liquid crystal panel. As shown in FIG. 15, in the range of intermediate values, the difference in contrast ratio between an image formed by sub-pixels on the odd-number row side and an image formed by sub-pixels on the even-number row side is large in observation from a certain direction. A veil-view pattern is preferably formed in such an intermediate value range in which a sufficient difference in perception between the odd-number rows and even-number rows can be achieved.

The second image is preferably a veil-view pattern. The veil-view pattern is a display image that is to be superimposed with the first image to make the first image less perceivable. Displaying the veil-view pattern further enhances the privacy. The veil-view pattern is not limited, and may be a geometric pattern such as a striped pattern or a checkered pattern, characters, or an image.

Figure 16:
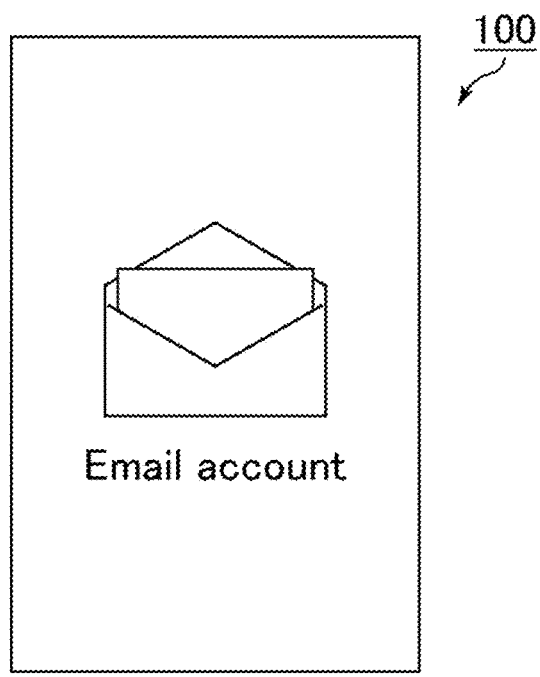
FIG. 16 is a schematic view of a display screen of a liquid crystal panel observed from the normal direction.
Figure 17:
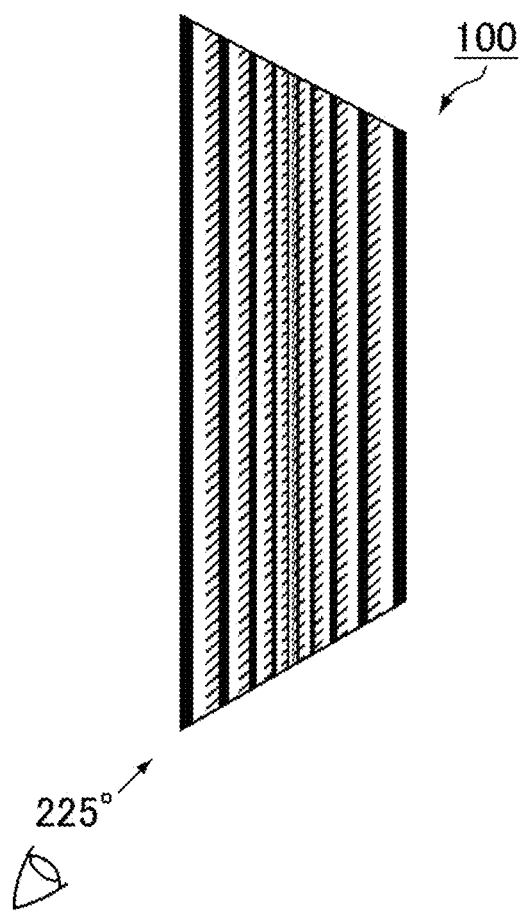
FIG. 17 is a schematic view of the display screen of the liquid crystal panel observed at an azimuth of 225°.
Figure 18:
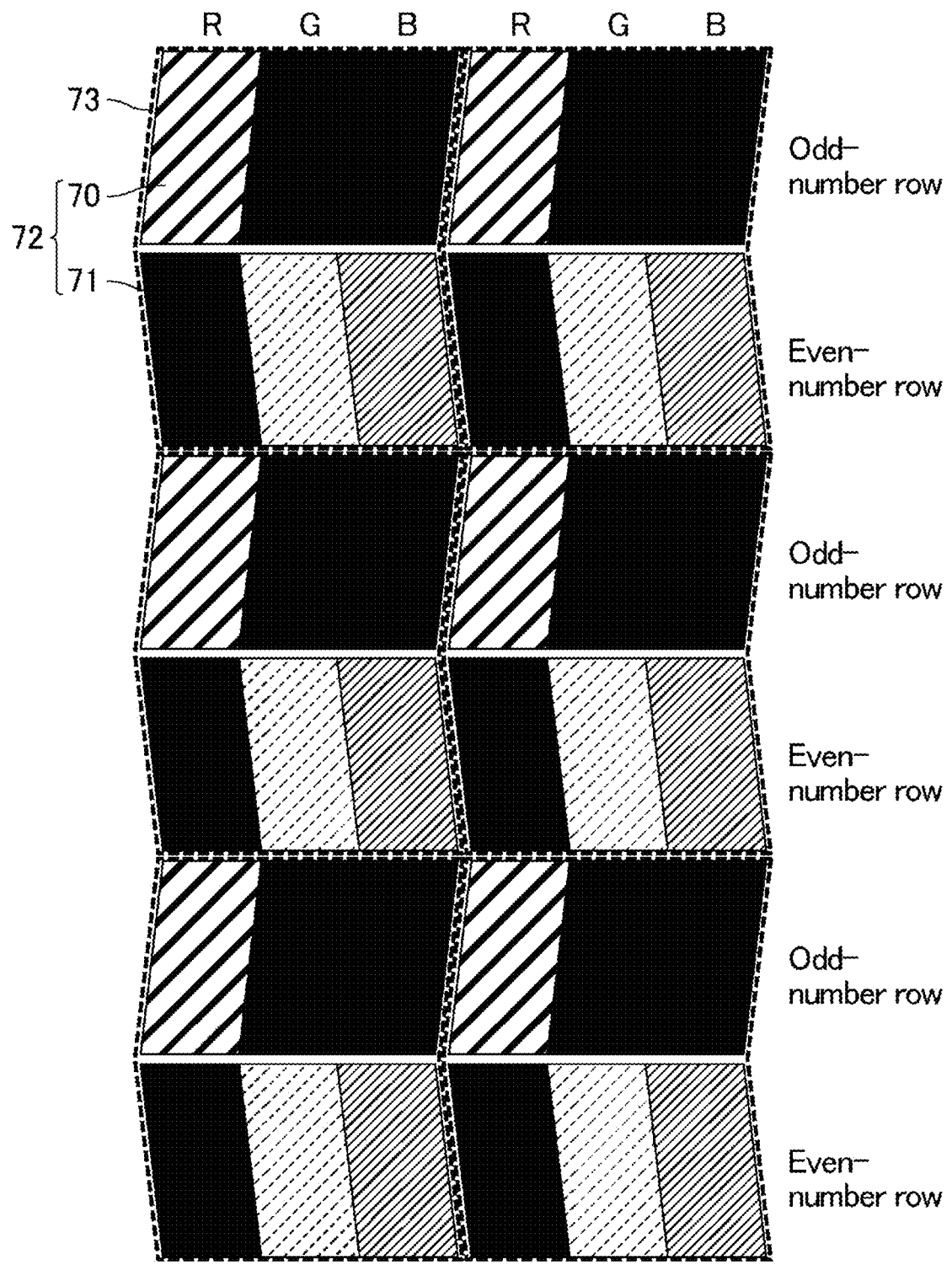
FIG. 18 is a schematic plan view of the liquid crystal panel, showing arrangement of color elements in a portion for displaying cyan stripes shown in FIG. 17.
Figure 19:
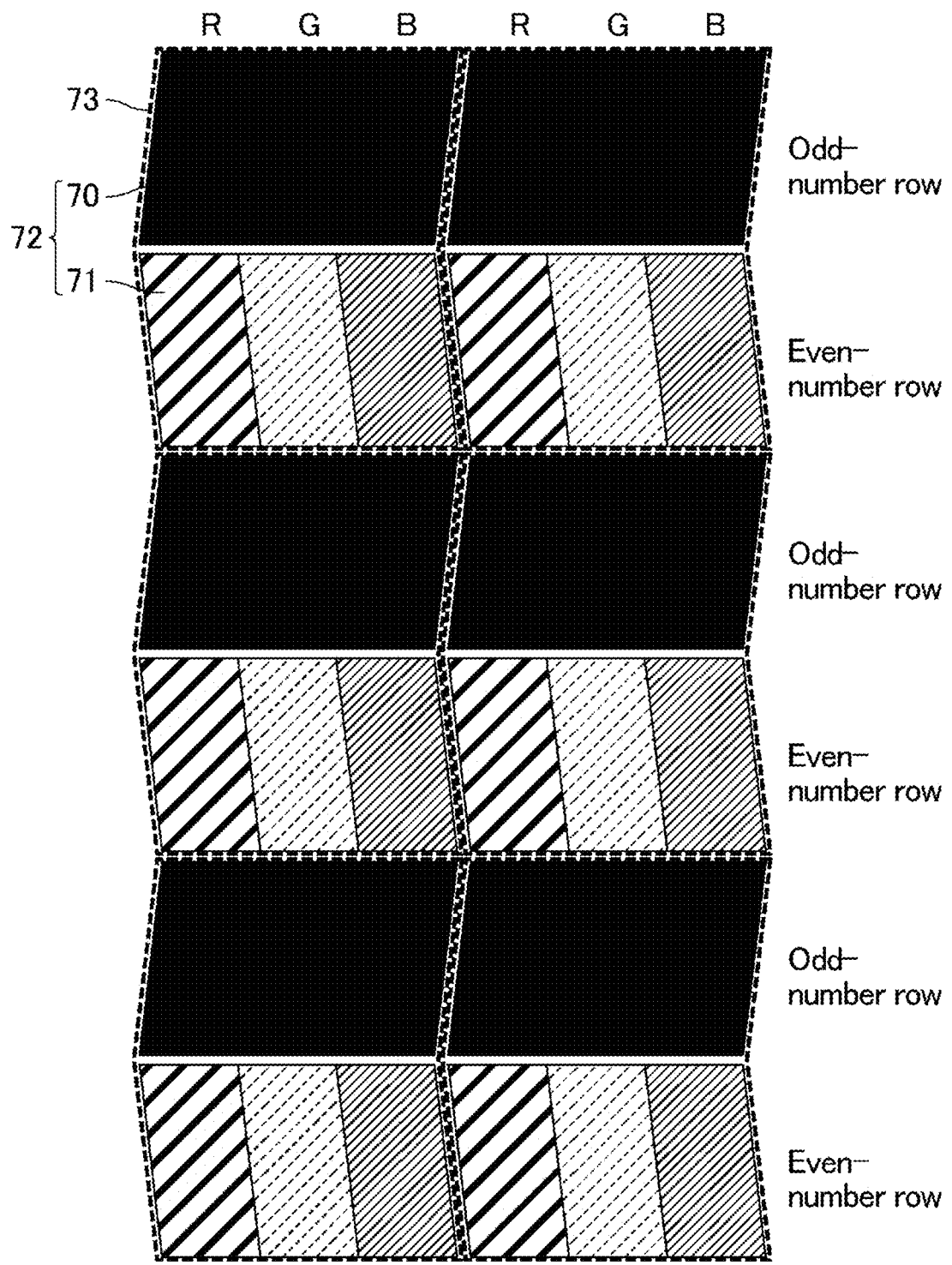
FIG. 19 is a schematic plan view of the liquid crystal panel, showing arrangement of color elements in a portion for displaying white stripes shown in FIG. 17.
Figure 20:
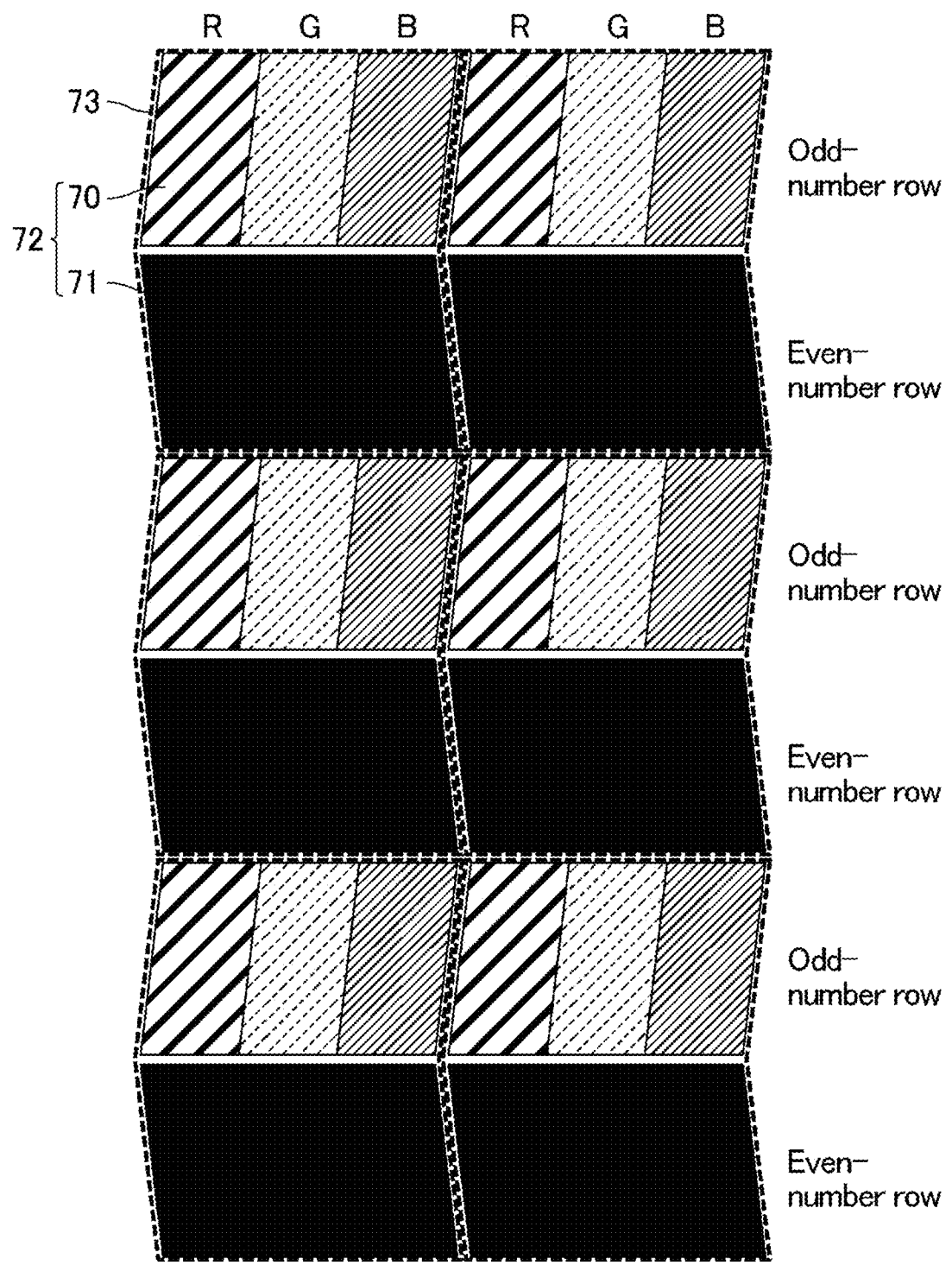
FIG. 20 is a schematic plan view of the liquid crystal panel showing arrangement of color elements in a portion for displaying black stripes shown in FIG. 17.

A specific example of the veil-view pattern is described below with reference to FIG. 16 to FIG. 20. FIG. 18 to FIG. 20 schematically show the first sub-pixel 70 and the second sub-pixel 71 shown in the drawings including FIG. 1. FIG. 16 is a schematic view of a display screen of a liquid crystal panel observed from the normal direction. FIG. 17 is a schematic view of the display screen of the liquid crystal panel observed at an azimuth of 225°. When the display screen of the liquid crystal panel is observed from the normal direction, an envelope image and the characters "Email account" are perceived as the first image as shown in FIG. 16. When the display screen of the liquid crystal panel is observed at an azimuth of 225°, a striped pattern as shown in FIG. 17 is perceived as the veil-view pattern on the first image. This makes the first image less perceivable from oblique directions, enhancing the privacy.

As shown in FIG. 17, the striped pattern is perceived as, for example, stripes of cyan, white, and black in observation at an azimuth of 225° and stripes of red, black, and white in observation at an azimuth of 315°.

FIG. 18 is a schematic plan view of a liquid crystal panel showing arrangement of color elements in a portion for displaying cyan stripes shown in FIG. 17. As shown in FIG. 18, color elements 73 are arranged in the row and column directions of the liquid crystal panel, with the first red sub-pixels 70R, the second green sub-pixels 71G, and the second blue sub-pixels 71B providing normal display and the second red sub-pixels 71R, the first green sub-pixels 70G, and the first blue sub-pixels 70B providing black display. With this arrangement, the liquid crystal display device can display cyan stripes as the second image in observation at an azimuth of 225° and red stripes as the second image in observation at an azimuth of 315°. The normal display is display for the first image.

FIG. 19 is a schematic plan view of a liquid crystal panel showing arrangement of color elements in a portion for displaying white stripes shown in FIG. 17. For white stripes, as shown in FIG. 19, the color elements 73 are arranged in the row and column directions of the liquid crystal panel, with the first red sub-pixels 70R, the first green sub-pixels 70G, and the first blue sub-pixels 70B providing black display and the second red sub-pixels 71R, the second green sub-pixels 71G, and the second blue sub-pixels 71B providing normal display. With this arrangement, the liquid crystal display device can display white stripes in observation at an azimuth of 225° and black stripes in observation at an azimuth of 315°.

FIG. 20 is a schematic plan view of the liquid crystal panel showing arrangement of color elements in a portion for displaying black stripes shown in FIG. 17. For black stripes, as shown in FIG. 20, the color elements 73 are arranged in the row and column directions of the liquid crystal panel, with the first red sub-pixels 70R, the first green sub-pixels 70G, and the first blue sub-pixels 70B providing normal display and the second red sub-pixels 71R, the second green sub-pixels 71G, and the second blue sub-pixels 71B providing black display. With this arrangement, the liquid crystal display device can display black stripes in observation at an azimuth of 225° and white stripes in observation at an azimuth of 315°.

Hereinafter, the effects of the present invention are described based on examples and comparative examples. The examples, however, are not intended to limit the scope of the present invention.

Example 1

A liquid crystal display device according to Example 1 includes the liquid crystal panel 100 and the control circuit 200. The liquid crystal panel 100 has the structure shown in FIG. 1 to FIG. 4A and FIG. 4B. The control circuit 200 operates the control shown in FIG. 5 and FIG. 12. The liquid crystal panel 100 sequentially includes the first polarizer 61, the active matrix substrate 10, the first alignment film 41, the liquid crystal layer 20, the second alignment film 42, the counter substrate 30, and the second polarizer 62. The absorption axis 61A of the first polarizer 61 and the absorption axis 62A of the second polarizer 62 were made perpendicular to each other, and the absorption axis 62A was made parallel to the longitudinal direction of the sub-pixels.

The active matrix substrate 10 sequentially includes the first substrate 11, a 100-nm-thick ITO solid electrode as each first electrode 12, a 100-μm-thick silicon nitride film as the first insulating layer 13, and an ITO electrode disposed for each sub-pixel as each second electrode 14. Each second electrode 14 included the linear electrode portions 14a, and the ratio of width $L_{14}$ of one linear electrode portion 14a/distance $S_{14}$ between two adjacent linear electrode portions 14a was 2.5 μm/3 μm. The angle θ1 formed by the extending direction (first direction) D1 of the linear electrode portions 14a and the absorption axis 62A was 5°.

The liquid crystal layer 20 contained the liquid crystal molecules 21 having a negative anisotropy of dielectric constant (Δε=−3.3) and had a thickness of 3 μm. The retardation (Δnd) of the liquid crystal layer 20 was 324. The first alignment film 41 used was a photoalignment film subjected to a photoalignment treatment for aligning the liquid crystal molecules at a pre-tilt angle of 0° with respect to the surface of the active matrix substrate 10. The second alignment film 42 used was a photoalignment film subjected to a photoalignment treatment for aligning the liquid crystal molecules at a pre-tilt angle of 30° with respect to the surface of the counter substrate 30.

The counter substrate 30 sequentially includes the second substrate 31, the color filters 32 and the black matrix 33, a 1.5-μm-thick resin layer as the first dielectric layer 37, a 100-nm-thick ITO electrode as the third electrode 34, a 300-nm-thick silicon nitride film as the second insulating layer 35, and a 100-nm-thick ITO electrode as the fourth electrode 36. The third electrode 34 included the linear electrode portions 34a, and the ratio of width $L_{34}$ of one linear electrode portion 34a/distance $S_{34}$ between two adjacent linear electrode portions 34a was 3.4 μm/3.4 μm. The fourth electrode 36 included the linear electrode portions 36a, and the ratio of width $L_{36}$ of one linear electrode portion 36a/distance $S_{36}$ between two adjacent linear electrode portions 36a was 3.4 μm/3.4 μm. The linear electrode portions 34a and the linear electrode portions 36a both extended in the second direction D2, and the angle θ2 formed by the first direction D1 and the second direction D2 was 85°.

The first electrode 12 is disposed for each sub-pixel, is electrically connected to the corresponding TFT, and receives a different voltage for each sub-pixel from the control circuit 200. The second electrodes 14 disposed for the respective sub-pixels are electrically connected to each other. The second electrodes 14 are grounded, and the voltage (0 V) applied to the second electrodes 14 is considered as the constant voltage (common voltage). The control circuit 200 switched between application of alternating voltage and application of constant voltage to the third electrode 34 and/or the fourth electrode 36, whereby display modes were switched.

Example 2

A liquid crystal display device according to Example 2 has the same structure as that of Example 1, except that the second alignment film 42 used was a photoalignment film subjected to a photoalignment treatment for aligning the liquid crystal molecules at a pre-tilt angle of 20° with respect to the surface of the counter substrate 30.

Example 3

A liquid crystal display device according to Example 3 has the same structure as that of Example 1, except that the second alignment film 42 used was a photoalignment film subjected to a photoalignment treatment for aligning the liquid crystal molecules at a pre-tilt angle of 10° with respect to the surface of the counter substrate 30.

Example 4

A liquid crystal display device according to Example 4 has the same structure as that of Example 1, except that a 100-nm-thick ITO solid electrode was used as the third electrode 34.

Comparative Example 1

A liquid crystal display device according to Comparative Example 1 has the same structure as that of Example 1, except that the second alignment film 42 used was a photoalignment film subjected to a photoalignment treatment for aligning the liquid crystal molecules at a pre-tilt angle of 5° with respect to the surface of the counter substrate 30.

<Checking of Respective Display Modes>

Concerning the liquid crystal display devices according to Examples 1 to 3 and Comparative Example 1, (1) mode efficiency, (2) front contrast ratio, and (3) response speed in the first display mode (narrow viewing angle mode), the second display mode (wide viewing angle mode), and the third display mode (high speed response mode) were determined in the following ways. The contrast ratio was simulated in the azimuth range from 0° to 360° to make (4) study of viewing angle in each display mode, and whether switching between the three display modes can be achieved or not was checked. The determinations (1) to (3) and the simulation (4) were performed in the following manners: in the narrow viewing angle mode, the third electrode was grounded and a constant voltage (0 V) common to the common voltage was applied to the fourth electrode; in the wide viewing angle mode, an alternating voltage of 10 V relative to the constant voltage was applied to the third electrode and the fourth electrode; and in the high speed response mode, the third electrode was grounded and an alternating voltage of 10 V relative to the constant voltage was applied to the fourth electrode.

(1) Mode Efficiency

The mode efficiency is represented by the following formula (1).

$$\text{Mode efficiency (\%)} = (\text{maximum luminance in crossed Nicols})/(\text{luminance in parallel Nicols}) \times 100 \quad (1)$$

Here, the maximum luminance in crossed Nicols is the maximum luminance when a pair of polarizers is arranged in crossed Nicols relative to the liquid crystal panel, the second electrodes is grounded, and the voltage applied to the first electrodes is changed from 0 to 6 V. The luminance in parallel Nicols in each display mode is the luminance with no voltage applied when a pair of polarizers is arranged in parallel Nicols relative to the liquid crystal panel. The luminance of each liquid crystal display device was estimated using an LCD Master 3D (available from Shintech Co., Ltd., Inc.). The mode efficiency was determined at every 10° in the polar angle range from 0° to 70°, with the normal direction of the liquid crystal panel defined as 0° and the surface of the liquid crystal panel defined as 90°.

(2) Front Contrast Ratio

The front contrast ratio was calculated according to the following formula (2) using an LCD master 3D (available from Shintech Co., Ltd.). The maximum luminance with voltage applied and the luminance with no voltage applied in the formula are luminances with a liquid crystal panel sandwiched between paired polarizers arranged in the crossed Nicols.

$$CR=\text{maximum luminance with voltage applied/luminance with no voltage applied} \quad (2)$$

(3) Response Speed

The response speed was calculated using an LCD master 3D (available from Shintech Co., Ltd.) with an assumption that the second electrodes were grounded and an alternating voltage of 6 V relative to the common voltage was applied to the first electrodes.

(4) Study of Viewing Angles in Each Display Mode

Contrast ratios were simulated using an LCD master 3D (available from Shintech Co., Ltd.) in the case the display panel was observed in a polar angle range from 0° to 80° and an azimuth range from 0° to 360° with the common voltage applied to the second electrodes and an alternating voltage of 6 V relative to the common voltage applied to the first electrodes. From the obtained simulation figures, the viewing angle range in each display mode was determined. An azimuth at which the contrast ratio is high indicates good perception at the azimuth.

Figure 21:
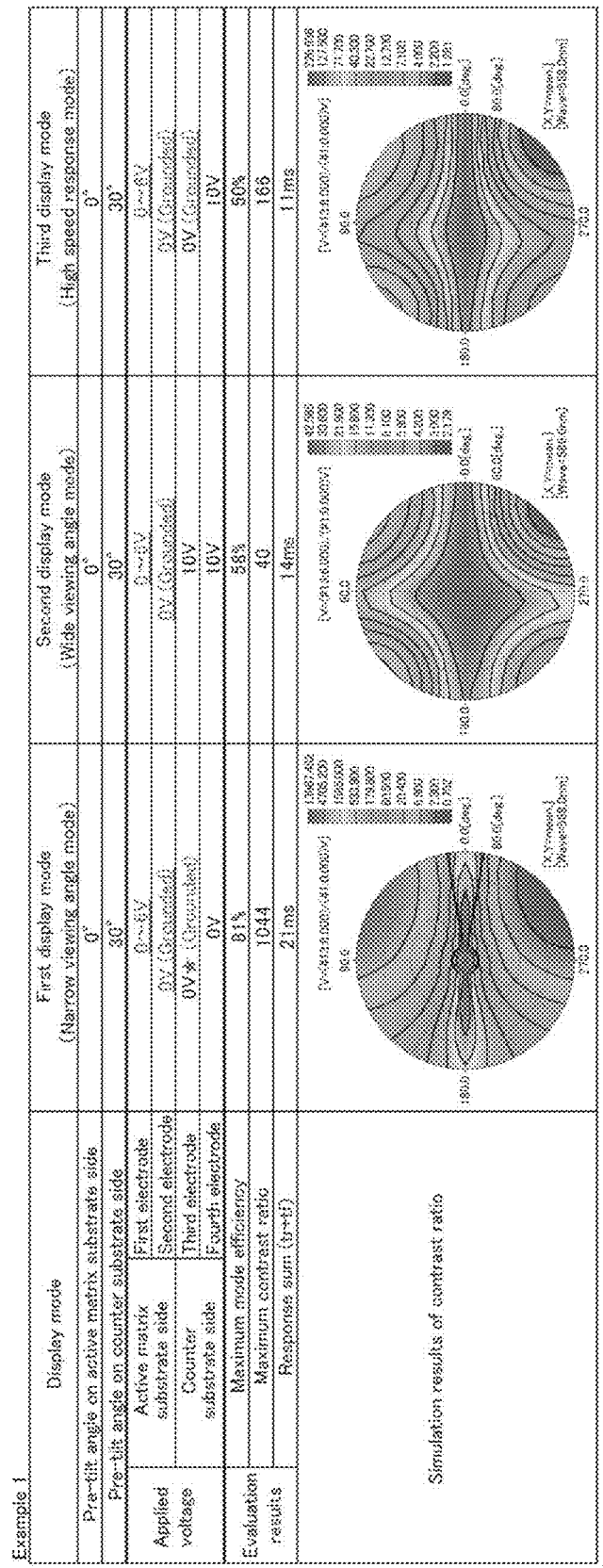
FIG. 21 shows a table summarizing evaluation results of a liquid crystal display device according to Example 1.

FIG. 21 shows a table summarizing evaluation results of the liquid crystal display device according to Example 1. In FIG. 21 and the later-described FIG. 26 to FIG. 28, the expression "pre-tilt angle on the active matrix substrate side" means the pre-tilt angle of the liquid crystal molecules aligned by the alignment film on the active matrix substrate side with respect to the surface of the active matrix substrate, and the expression "pre-tilt angle on the counter substrate side" means the pre-tilt angle of the liquid crystal molecules aligned by the alignment film on the counter substrate side with respect to the surface of the counter substrate. In the case where an electrode is grounded, the term "grounded" was given in the drawings. As shown in FIG. 21, the simulation results of the contrast ratios demonstrate that the contrast ratio is high at 0°-180° but low at other azimuths in the narrow viewing angle mode, which indicates that an image is less perceivable from the top-bottom directions and the oblique directions. In the wide viewing angle mode and the high speed response mode, the contrast ratio is high at 90°-270° azimuths and 0°-180° azimuths, which indicates that an image is perceivable at a wider azimuth than in the narrow viewing angle mode. The high speed response mode was confirmed to provide a smaller value of the response sum and a higher response speed than the other display modes.

Figure 22:
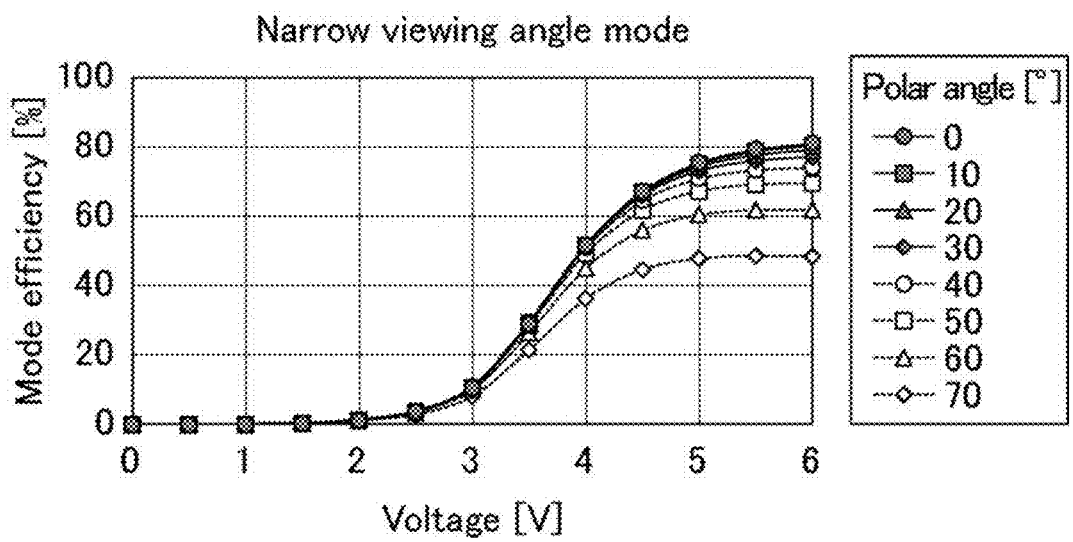
FIG. 22 is a graph showing mode efficiencies in the narrow viewing angle mode in Example 1.
Figure 23:
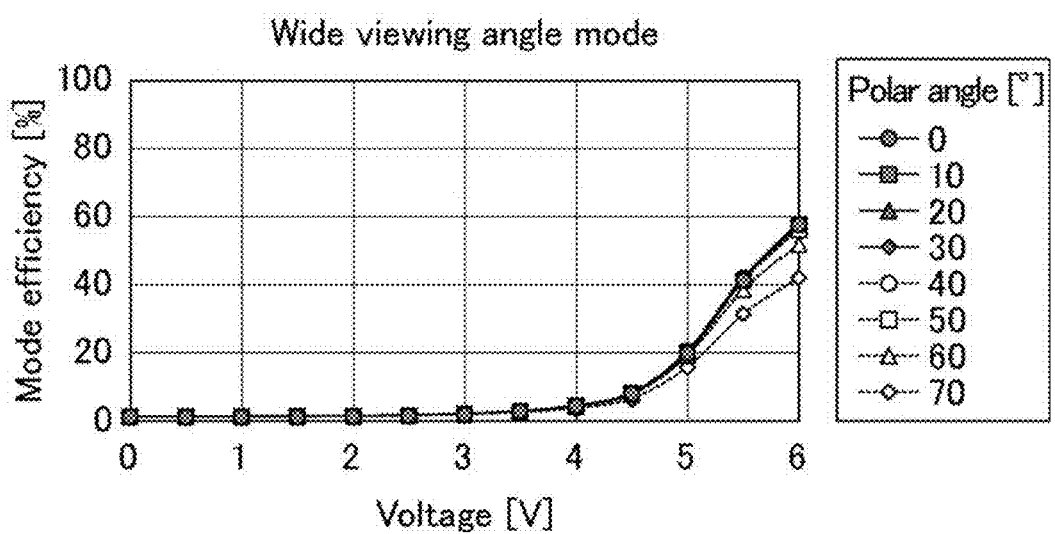
FIG. 23 is a graph showing mode efficiencies in the wide viewing angle mode in Example 1.
Figure 24:
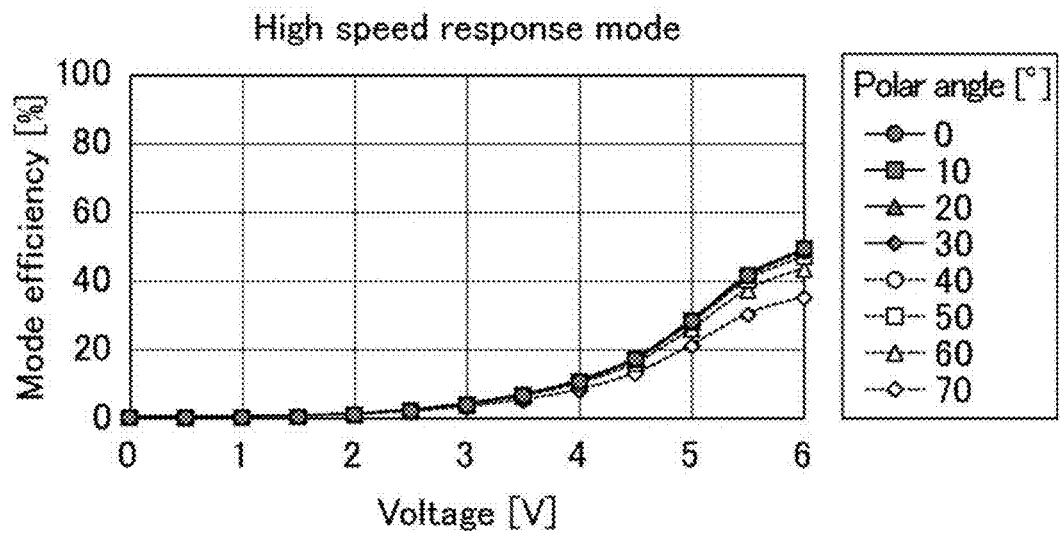
FIG. 24 is a graph showing mode efficiencies in the high speed response mode in Example 1.
Figure 25:
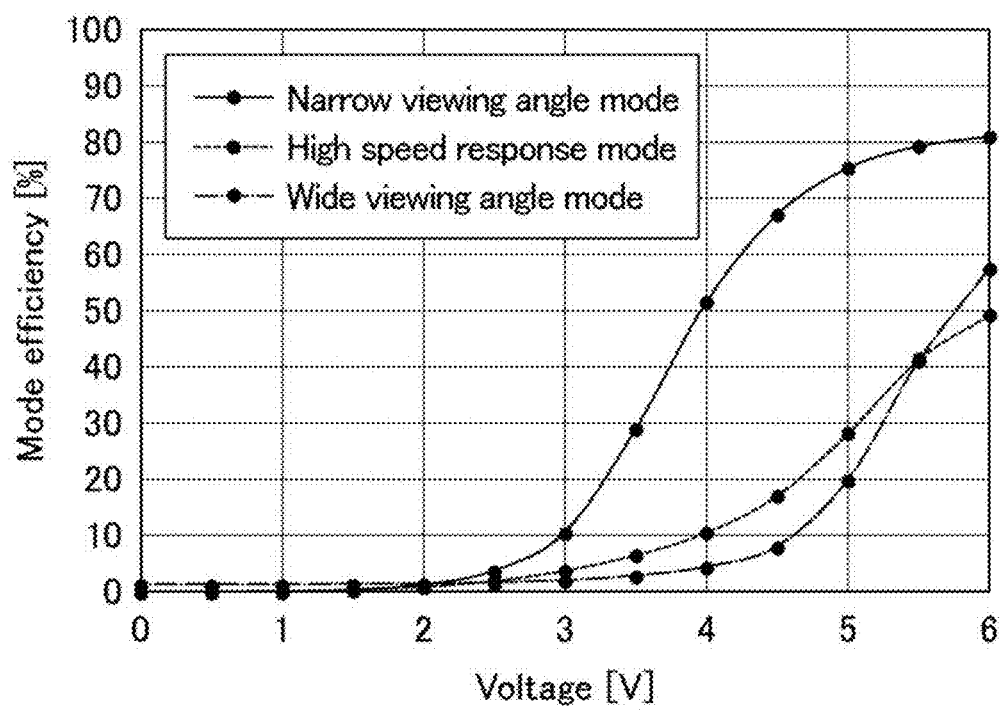
FIG. 25 is a graph for comparing the front mode efficiency between the display modes shown in FIG. 22 to FIG. 24.

FIG. 22 is a graph showing mode efficiencies in the narrow viewing angle mode in Example 1. FIG. 23 is a graph showing mode efficiencies in the wide viewing angle mode in Example 1. FIG. 24 is a graph showing mode efficiencies in the high speed response mode in Example 1. FIG. 22 to FIG. 24 demonstrate that grayscale display can be provided in any display mode. FIG. 22 demonstrates that in the narrow viewing angle mode, the greater the polar angle is, the lower the mode efficiency is, and that an image is less observable in a wide viewing angle range than from the normal direction. FIG. 25 is a graph for comparing the front mode efficiency between the display modes shown in FIG. 22 to FIG. 24. FIG. 25 shows a comparison in mode efficiency (front mode efficiency) with the liquid crystal panel observed from the front (polar angle 0°) between the display modes. FIG. 25 also demonstrates that one liquid crystal display device can achieve three display modes.

FIG. 26 shows a table summarizing evaluation results of the liquid crystal display device according to Example 2. The results shown in FIG. 26 demonstrate that, also in Example 2, the contrast ratio is higher at 0°-180° azimuths than other azimuths in the narrow viewing angle mode. In the wide viewing angle mode and the high speed response mode, the contrast ratio is high at 90°-270° azimuths and 0°-180° azimuths, which indicates that an image is perceivable at a wider azimuth than in the narrow viewing angle mode. The high speed response mode was confirmed to provide a smaller value of the response sum and a higher response speed than the other display modes.

FIG. 27 shows a table summarizing evaluation results of the liquid crystal display device according to Example 3. The results shown in FIG. 27 demonstrate that in the narrow viewing angle mode in Example 3, the contrast ratios at 0°-180° azimuths are slightly higher than those at 0°-180° azimuths in the narrow viewing angle mode in Examples 1 and 2 but is higher than at other azimuths, which means the narrow viewing angle mode was achieved. The results also demonstrate that in the wide viewing angle mode and the high speed response mode, the contrast ratio is high at 90°-270° azimuths and 0°-180° azimuths and an image is perceivable at wider azimuths than in the narrow viewing angle mode. Also, the high speed response mode is confirmed to provide a smaller response sum and a higher response speed than the other display modes.

Figure 28:
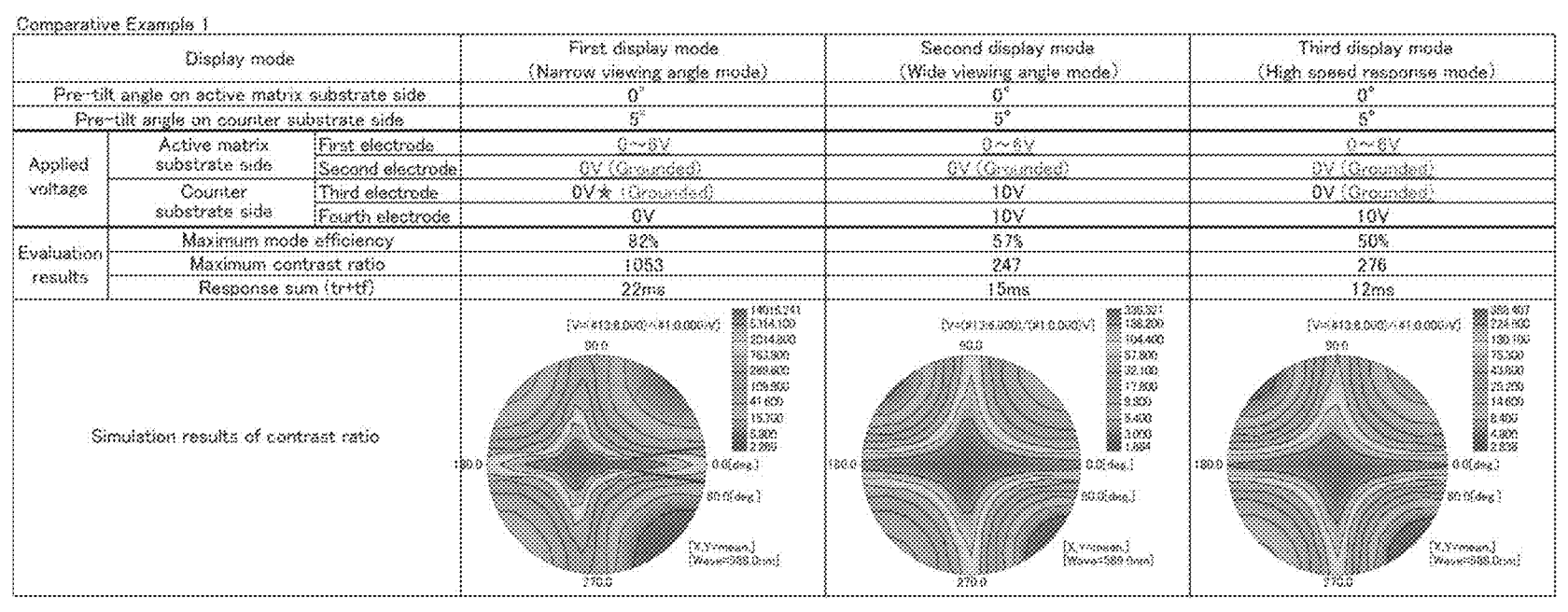

FIG. 28 shows a table summarizing evaluation results of the liquid crystal display device according to Comparative Example 1. The simulation results of the contrast ratios shown in FIG. 28 demonstrate that even under an operation corresponding to the narrow viewing angle mode in Example 1, the difference between the contrast ratios at 90°-270° azimuths and the contrast ratios at 0°-180° azimuths was small, and the liquid crystal display device failed to achieve the narrow viewing angle mode.

The simulation results of the contrast ratios in Examples 1 to 3 and Comparative Example 1 demonstrate that in the case of using liquid crystal molecules having a negative anisotropy of dielectric constant, the pre-tilt angle of the liquid crystal molecules on the counter substrate side is important for achieving the narrow viewing angle mode, and the narrow viewing angle mode can be achieved by disposing on the counter substrate side an alignment film that aligns the liquid crystal molecules at a pre-tilt angle of 10° or greater and 30° or smaller with respect to the surface of the counter substrate.

<Study of Response Speed in Room Temperature Environment and Low Temperature Environment>

Using the liquid crystal display device according to Example 1, the response speed was compared between in a room temperature (25° C.) environment and in a low temperature (−20° C.) environment in each of the narrow viewing angle mode and the high speed response mode. Each response speed value was calculated using an LCD master 3D (available from Shintech Co., Ltd.) with an assumption that the second electrodes were grounded and an alternating voltage of 6 V relative to the common voltage was applied to the first electrodes. In the narrow viewing angle mode, an assumption was made in which the third electrode was grounded and the constant voltage (0 V) common to the common voltage was applied to the fourth electrode. In the high speed response mode, an assumption was made in which the third electrode was grounded and an alternating voltage of 20 V relative to the constant voltage was applied to the fourth electrode. Table 1 shows the results.

TABLE 1

| Display mode | | | First display mode (Narrow Viewing angle mode) | Third display mode (High speed response mode) |
|---|---|---|---|---|
| Pre-tilt angle on active matrix substrate side | | | 0° | 0° |
| Pre-tilt angle on counter substrate side | | | 30° | 30° |
| Applied voltage | Active matrix substrate side | First electrode | 0 to 6 V | 0 to 6 V |
| | | Second electrode | 0 V (Grounded) | 0 V (Grounded) |
| | Counter substrate side | Third electrode | 0 V (Grounded) | 0 V (Grounded) |
| | | Fourth electrode | 0 V | 20 V |
| Room temperature (25° C.) | Rising response speed tr (ms) | | 12 | 6 |
| | Falling response speed tf (ms) | | 10 | 7 |
| | Response sum (tr + tf) (ms) | | 22 | 13 |
| Low temperature (−20° C.) | Rising response speed tr (ms) | | 114 | 131 |
| | Falling response speed tf (ms) | | 188 | 154 |
| | Response sum (tr + tf) (ms) | | 302 | 285 |

As shown in Table 1, in both of a room temperature environment and a low temperature environment, the high speed response mode achieved a higher response speed than the narrow viewing angle mode.

<Study of Contrast Ratio in High Speed Response Mode>

Using the liquid crystal display device according to Example 4, (5) luminance in black display in high speed response mode and (6) front contrast ratio in high speed response mode were calculated for the following two cases: (A) the case in which a constant voltage was applied to the third electrode (the third electrode was grounded) and an alternating voltage was applied to the fourth electrode to provide display in the high speed response mode; and (B) the case in which a constant voltage was applied to the fourth electrode (the fourth electrode was grounded) and an alternating voltage was applied to the third electrode to provide display in the high speed response mode. The calculation was performed in the condition that the second electrodes were grounded, the voltage (0 V) applied to the second electrodes was defined as the constant voltage (common voltage), and the constant voltage (0 V) common to the common voltage was applied to the first electrodes. Table 2 shows the voltages applied to the respective electrodes in the cases (A) and (B).

TABLE 2

| Display mode | | | (A) Third display mode (High speed response mode) | (B) Third display mode (High speed response mode) |
|---|---|---|---|---|
| Pre-tilt angle on active matrix substrate side | | | 0° | 0° |
| Pre-tilt angle on counter substrate side | | | 30° | 30° |
| Applied voltage | Active matrix substrate side | First electrode | 0 V | 0 V |
| | | Second electrode | 0 V (Grounded) | 0 V (Grounded) |
| | Counter substrate side | Third electrode | 0 V (Grounded) | 0 to 15 V |
| | | Fourth electrode | 0 to 15 V | 0 V (Grounded) |

(5) Luminance in Black Display in High Speed Response Mode

In the case (A), the constant voltage was applied to the third electrode, and an alternating voltage (90 Hz) of 0 to 15 V relative to the constant voltage was applied to the fourth electrode. In the case (B), the constant voltage was applied to the fourth electrode, and an alternating voltage (90 Hz) of 0 to 15 V relative to the constant voltage was applied to the third electrode. Then, black display was provided in the high speed response mode. The luminance in black display was estimated with an LCD master 3D (available from Shintech Co., Ltd.).

(6) Front Contrast Ratio in High Speed Response Mode

Black display was provided in the high speed response mode in the cases (A) and (B) in the same manner as in (5), and the front contrast ratios were calculated according to the method described in the above "(2) Front contrast ratio".

Figure 29:
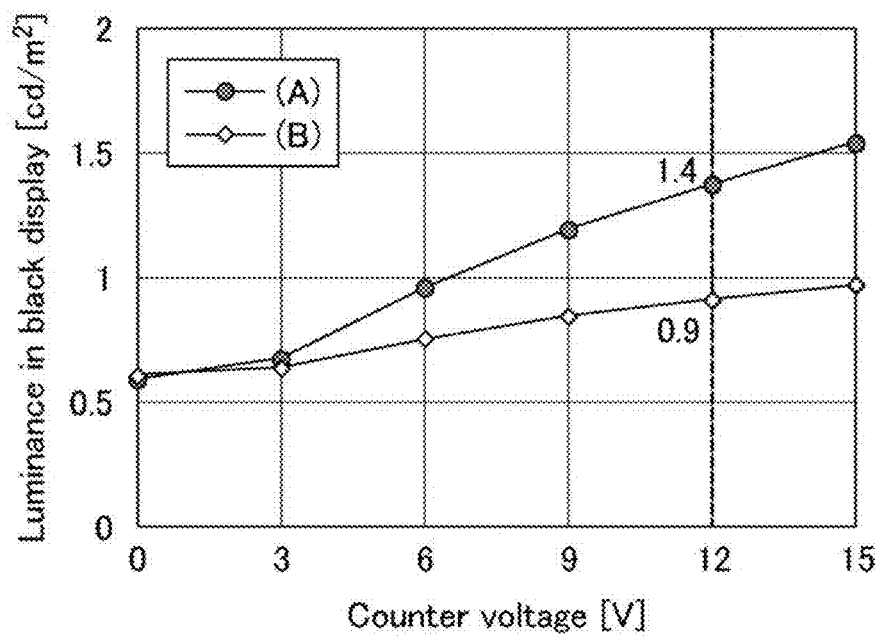
FIG. 29 is a graph for comparing the luminances in black display between a case of applying voltage to a third electrode and a case of applying voltage to a fourth electrode, (both) in the high speed response mode.
Figure 30:
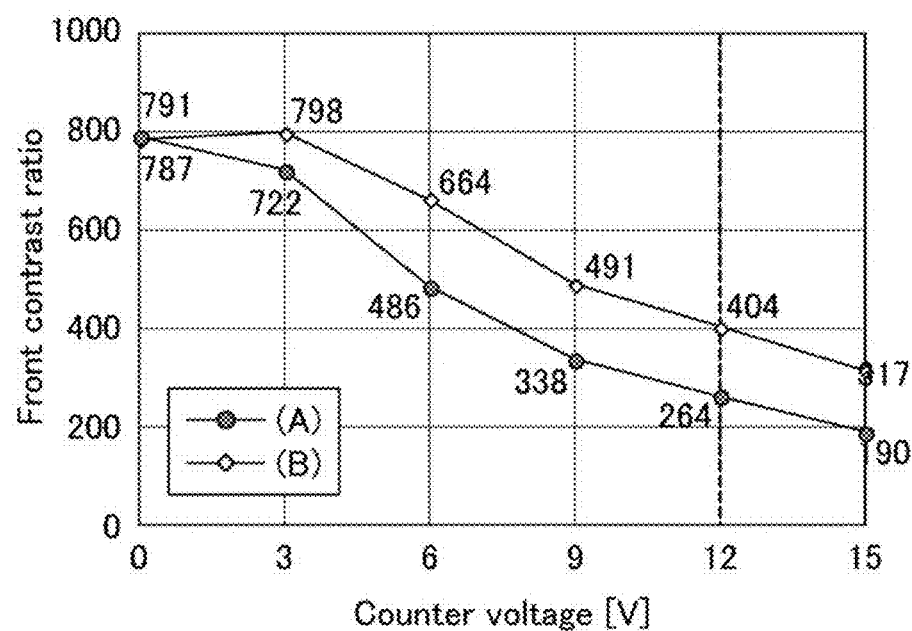
FIG. 30 is a graph for comparing the front contrast ratios between a case of applying voltage to a third electrode and a case of applying voltage to a fourth electrode, (both) in the high speed response mode.

FIG. 29 is a graph for comparing the luminances in black display between a case of applying voltage to a third electrode and a case of applying voltage to a fourth electrode, (both) in the high speed response mode. FIG. 30 is a graph for comparing the front contrast ratios between a case of applying voltage to a third electrode and a case of applying voltage to a fourth electrode, (both) in the high speed response mode. In FIG. 29 and FIG. 30, the voltage applied to the third electrode or the fourth electrode was shown as "counter voltage". FIG. 29 demonstrates that the case (B) can achieve lower luminance in black display than the case (A). The case (B), providing a low luminance in black display, can achieve a higher front contrast ratio than the case (A) as shown in FIG. 30. In the case (B), an alternating voltage is applied to the third electrode which is located farther from the liquid crystal layer. Thus, the electric field in the thickness direction of the liquid crystal layer is weaker than that in the case (A) in which an alternating voltage is applied to the fourth electrode which is located closer to the liquid crystal layer. This presumably allows the case (B) to achieve better horizontal alignment of the liquid crystal molecules and to reduce or prevent light leakage in black display.

As shown in FIG. 29, the luminance in black display at a counter voltage of 12 V was 1.4 cd/m$^2$ in the case (A), but the luminance was reduced to 0.9 cd/m$^2$ in the case (B). As shown in FIG. 30, the front contrast ratio at a counter voltage of 12 V was 264 in the case (A), but the front contrast ratio was increased to 404 in the case (B). These results demonstrate that in the structure in the case (B), the contrast ratio for display in the high speed response mode can be increased by setting the alternating voltage applied to the third electrode to be higher than the constant voltage by 12 V or more.

REFERENCE SIGNS LIST

1: gate line
2: source line
3: TFT
10: active matrix substrate
11: first substrate
12: first electrode
13: first insulating layer
14: second electrode
14a, 34a, 36a: linear electrode portion
14b: opening
20: liquid crystal layer
21: liquid crystal molecule
30: counter substrate
31: second substrate
32: color filter
32B: blue color filter
32G: green color filter
32R: red color filter
33: black matrix
34: third electrode
35: second insulating layer
36: fourth electrode
37: first dielectric layer
41: first alignment film
42: second alignment film
61: first polarizer
61A: absorption axis of first polarizer
62: second polarizer
62A: absorption axis of second polarizer
70: sub-pixel (first sub-pixel)
70B: first blue sub-pixel
70G: first green sub-pixel
70R: first red sub-pixel
71: second sub-pixel
71B: second blue sub-pixel
71G: second green sub-pixel
71R: second red sub-pixel
72: display unit
72B: blue display unit
72G: green display unit
72R: red display unit
73: color element
100: liquid crystal panel
101: first electrode drive circuit
102: second electrode drive circuit
103: third electrode drive circuit
104: fourth electrode drive circuit
200: control circuit
201: image signal synthesis circuit
202: display mode selection circuit
203: application voltage switching circuit
204: database
211: raw image signal
212: image signal
213: display mode switching signal
214: first display mode selection signal
215: second display mode selection signal
216: third display mode selection signal
217: alternating signal
218: constant voltage signal
219: veil-view display switching signal
220: veil-view pattern image signal

What is claimed is:

1. A liquid crystal display device comprising:
a liquid crystal panel; and
a control circuit,
the liquid crystal panel comprising sub-pixels arranged in a matrix pattern in an in-plane direction and sequentially comprising an active matrix substrate, a first alignment film, a liquid crystal layer containing liquid crystal molecules having a negative anisotropy of dielectric constant, a second alignment film, and a counter substrate,
the second alignment film aligning the liquid crystal molecules with no voltage applied at an angle of 10° or greater and 30° or smaller with respect to the counter substrate,
the active matrix substrate including a first substrate, and a first electrode and a second electrode that are stacked via a first insulating layer or that face each other on the first substrate,
at least one of the first electrode or the second electrode being disposed for each sub-pixel and including linear electrode portions extending in a first direction,
the counter substrate sequentially including a second substrate, a third electrode, a second insulating layer, and a fourth electrode,
at least one of the third electrode or the fourth electrode including linear electrode portions extending in a second direction intersecting the first direction in a plan view,
the control circuit being configured to switch between application of an alternating voltage and application of a constant voltage to the third electrode and/or the fourth electrode according to a certain display mode selected from a first display mode that allows a first image to be observable in a narrow viewing angle range including a normal direction of the liquid crystal panel, a second display mode that allows the first image to be observable in a wide viewing angle range including the narrow viewing angle range, and a third display mode that provides a higher response speed of the liquid crystal molecules than the first display mode and the second display mode.

2. The liquid crystal display device according to claim 1, wherein in the first display mode, the control circuit applies to the third electrode and the fourth electrode a constant voltage common to the first electrode or the second electrode,
in the second display mode, the control circuit executes operation (a) of applying an alternating voltage to the third electrode and the fourth electrode or operation (b) of applying to one of the third electrode and the fourth electrode a constant voltage common to the first electrode or the second electrode and applying an alternating voltage to the other of the third electrode and the fourth electrode, and
in the third display mode, the control circuit applies to one of the third electrode and the fourth electrode a constant voltage common to the first electrode or the second electrode and applies to the other of the third electrode and the fourth electrode an alternating voltage higher than the alternating voltage applied to the third electrode or the fourth electrode in the second display mode.

3. The liquid crystal display device according to claim 2, wherein in the third display mode, the control circuit applies to the third electrode a constant voltage common to the first electrode or the second electrode and applies to the fourth electrode an alternating voltage higher than the alternating voltage applied to the third electrode or the fourth electrode in the second display mode.

4. The liquid crystal display device according to claim 2, wherein in the third display mode, the control circuit applies to the fourth electrode a constant voltage common to the first electrode or the second electrode and applies to the third electrode an alternating voltage higher than the alternating voltage applied to the third electrode or the fourth electrode in the second display mode.

5. The liquid crystal display device according to claim 1, wherein the first direction and the second direction form an angle of 60° or greater and 90° or smaller.

6. The liquid crystal display device according to claim 1, wherein the third electrode and the fourth electrode each include linear electrode portions extending in the second direction intersecting the first direction in a plan view.

7. The liquid crystal display device according to claim 1, wherein the liquid crystal panel includes display units that utilize a veil-view function to display an image, the display units each include a pair of sub-pixels arranged adjacent to each other, one of the sub-pixels being a first sub-pixel selected from odd-number rows and the other being a second sub-pixel selected from even-number rows, and the control circuit in the first display mode inputs different image signals to the respective sub-pixels so as to allow a second image, different from the first image, to be observed in the wide viewing angle range.

* * * * *